United States Patent
Emaru

(10) Patent No.: US 9,424,057 B2
(45) Date of Patent: Aug. 23, 2016

(54) METHOD AND APPARATUS TO IMPROVE EFFICIENCY IN THE USE OF RESOURCES IN DATA CENTER

(71) Applicant: HITACHI, LTD., Chiyoda-ku, Tokyo (JP)

(72) Inventor: Hironori Emaru, Santa Clara, CA (US)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 14/017,647

(22) Filed: Sep. 4, 2013

(65) Prior Publication Data

US 2014/0007099 A1  Jan. 2, 2014

Related U.S. Application Data

(63) Continuation of application No. 13/213,118, filed on Aug. 19, 2011, now Pat. No. 8,549,519.

(51) Int. Cl.
*G06F 9/455* (2006.01)
*G06F 9/50* (2006.01)
*G06F 3/06* (2006.01)
*H04L 29/08* (2006.01)

(52) U.S. Cl.
CPC .......... *G06F 9/45533* (2013.01); *G06F 3/0607* (2013.01); *G06F 3/067* (2013.01); *G06F 3/0647* (2013.01); *G06F 9/5077* (2013.01); *G06F 9/5083* (2013.01); *H04L 67/1097* (2013.01); *H04L 67/34* (2013.01)

(58) Field of Classification Search
None
See application file for complete search history.

(56) References Cited

U.S. PATENT DOCUMENTS

| | | |
|---|---|---|
| 2004/0143832 A1 | 7/2004 | Yamamoto et al. |
| 2004/0162958 A1 | 8/2004 | Kano et al. |
| 2007/0130566 A1* | 6/2007 | van Rietschote ... G06F 9/45533 718/1 |
| 2009/0157984 A1 | 6/2009 | Hara et al. |
| 2009/0276771 A1* | 11/2009 | Nickolov et al. ............. 717/177 |
| 2010/0040058 A1 | 2/2010 | Iyengar |
| 2010/0058009 A1 | 3/2010 | Fujibayashi |
| 2010/0100696 A1 | 4/2010 | Suzuki |
| 2010/0312893 A1 | 12/2010 | Watanabe et al. |
| 2011/0113428 A1* | 5/2011 | Nelson et al. ..................... 718/1 |

OTHER PUBLICATIONS

Chinese Office Action received in corresponding Chinese Application No. 201210140212.0 dated Dec. 31, 2014.
Yarborough, J. et al., Hitachi Dynamic Provisioning Software "Zero Page Reclaim" feature, 2009, 23, Hitachi Data Systems.

* cited by examiner

*Primary Examiner* — Gregory A Kessler
(74) *Attorney, Agent, or Firm* — Mattingly & Malur, PC

(57) ABSTRACT

A method of managing use of resources in data center comprises: determining whether first storage subsystem includes a virtual volume or a storage pool that uses a physical volume of second storage subsystem and, if yes, migrating the physical volume to first storage subsystem; determining whether any storage subsystem includes a virtual volume created directly from a physical volume and, if yes, migrating the virtual volume to another virtual volume provisioned from the storage pool of the storage subsystem; and determining whether all virtual volumes satisfy a preset service level objective and, if no, then selecting a virtual machine which has a smallest virtual machine disk file and selecting a storage pool having a largest free space, and then selecting a virtual volume of the storage subsystem which has the selected storage pool and migrating the virtual machine disk file of the selected virtual machine to the selected virtual volume.

16 Claims, 20 Drawing Sheets

| | 2005 | 2010 | 2015 | 2020 | 2025 | 2030 | 2035 |
|---|---|---|---|---|---|---|---|
| 2110 Virtual Machine Name | VM_A1 | VM_A2 | VM_B1 | VM_A3 | VM_B2 | VM_B3 | VM_B4 |
| 2120 Virtual Machine Manager ID | VMM_A1 | VMM_A1 | VMM_B1 | VMM_A1 | VMM_B1 | VMM_B1 | VMM_B1 |
| 2130 File System of VMM ID | FS_A1 | FS_A1 | FS_B1 | FS_A2 | FS_B2 | FS_B3 | FS_B3 |
| 2135 C-PF ID of VM | 1500-A | 1500-A | 1500-B | 1500-A | 1500-B | 1500-B | 1500-B |
| 2140 Virtual Subsystem ID | VDKC_1 | | | | | | |
| 2150 Virtual Volume ID | VVOL_1 | | VVOL_2 | VVOL_3 | | VVOL_4 | |
| 2155 C-PF ID of VVOL | 1500-A | | 1500-A | 1500-A | | 1500-B | |
| 2160 Pool ID | Pool_A1 | | | - | | Pool_B1 | |
| 2170 Physical Volume ID (Tier, # of pages) | RG_A1(T1, 100), RG_A2(T2, 200) | | RG_B1(T3, 300) | RG_A3(T2, 500) | | RG_A4(T2,50) | RG_B2(T1, 50), RG_B3(T2, 100), RG_B4(T3, 500) |
| 2175 C-PF ID of PVOL | 1500-A | | 1500-B | 1500-A | | 1500-A | 1500-B |

|         | Tier1 | Tier2 | Tier3 |
|---------|-------|-------|-------|
| Pool_A1 | 100   | 600   | 1300  |
| Pool_B1 | 20    | 80    | 400   |

Fig. 8

|       | Average Response Time | Response Time Range |
|-------|-----------------------|---------------------|
| Tier1 | 0.05 msec             | ~0.10 msec          |
| Tier2 | 2.95 msec             | 0.10~4.00 msec      |
| Tier3 | 7.15 msec             | 4.00~msec           |

Fig. 9

| | 2007 | 2012 | 2017 | 2022 | 2027 | 2032 | 2037 |
|---|---|---|---|---|---|---|---|
| 2110 Virtual Machine Name | VM_A1 | VM_A2 | VM_B1 | VM_A3 | VM_B2 | VM_B3 | VM_B4 |
| 2120 Virtual Machine Manager ID | VMM_A1 | VMM_A1 | VMM_B1 | VMM_A1 | VMM_B1 | VMM_B1 | VMM_B1 |
| 2130 File System of VMM ID | FS_A1 | FS_A1 | FS_B1 | FS_A2 | FS_B2 | FS_B3 | FS_B3 |
| 2137 Server ID of VM | 1300-A | 1300-A | 1300-B | 1300-A | 1300-B | 1300-B | 1300-B |
| 2140 Virtual Subsystem ID | VDKC_1 | | | | | | |
| 2150 Virtual Volume ID | VVOL_1 | | VVOL_2 | VVOL_3 | | VVOL_4 | |
| 2157 Subsystem ID of VVOL | 1400-A | | 1400-A | 1400-A | | 1400-B | |
| 2160 Pool ID | Pool_A1 | | | - | | Pool_B1 | |
| 2170 Physical Volume ID (Tier, # of pages) | RG_A1(T1, 100), RG_A2(T2, 200), | | RG_B1(T3, 300) | RG_A3(T2, 500) | | RG_A4 (T2,50) | RG_B2(T1, 50), RG_B3(T2, 100), RG_B4(T3, 500) |
| 2177 Subsystem ID of PVOL | 1400-A | | 1400-B | 1400-A | | 1400-A | 1400-B |

| | 2009 | 2014 | 2019 | 2024 | 2029 | 2034 | 2039 | 2044 |
|---|---|---|---|---|---|---|---|---|
| 2110 Virtual Machine Name | VM_A1 | VM_A2 | VM_B1 | VM_A3 | VM_B2 | VM_B3 | VM_C1 | VM_C2 |
| 2120 Virtual Machine Manager ID | VMM_A1 | VMM_A1 | VMM_B1 | VMM_A1 | VMM_B1 | VMM_B1 | VMM_C1 | VMM_C1 |
| 2130 File System of VMM ID | FS_A1 | FS_A1 | FS_B1 | FS_A2 | FS_B2 | FS_B3 | FS_C1 | FS_C1 |
| 2137 Server ID of VM | 1300-A | 1300-A | 1300-B | 1300-A | 1300-B | 1300-B | 1300-C | 1300-C |
| 2139 DC ID of VM | 1100-A | 1100-A | 1100-B | 1100-A | 1100-B | 1100-B | 1100-B | 1100-B |
| 2140 Virtual Subsystem ID | VDKC_1 | | | | | | | |
| 2150 Virtual Volume ID | VVOL_1 | | VVOL_2 | VVOL_3 | | VVOL_4 | VVOL_5 | |
| 2157 Subsystem ID of VVOL | 1400-A | | 1400-A | 1400-A | | 1400-B | 1400-C | |
| 2159 DC ID of VVOL | 1100-A | | 1100-A | 1100-A | | 1100-B | 1100-B | |
| 2160 Pool ID | Pool_A1 | | | - | | Pool_B1 | Pool_C1 | |
| 2170 Physical Volume ID (Tier, # of pages) | RG_A1(T1, 100), RG_A2(T2, 200) | | RG_C1(T3, 300) | RG_A3(T2, 500) | | RG_B1 (T2,100) | RG_A4(T2, 50) | RG_C2(T1, 50), RG_C3(T2, 100), RG_C4(T3, 500) |
| 2177 Subsystem ID of PVOL | 1400-A | | 1400-C | 1400-A | | 1400-B | 1400-A | 1400-C |
| 2179 DC ID of PVOL | 1100-A | | 1100-B | 1100-A | | 1100-B | 1100-A | 1100-B |

METHOD AND APPARATUS TO IMPROVE EFFICIENCY IN THE USE OF RESOURCES IN DATA CENTER

This application is a continuation of U.S. patent application Ser. No. 13/213,118, filed Aug. 19, 2011, the entire disclosure of which is incorporated herein by reference.

BACKGROUND OF THE INVENTION

The present invention relates generally to storage systems and, more particularly, to method and apparatus to improve the efficiency in the use of resources in a data center.

Virtualization technology has become mature in data center. Virtualized server and virtualized application can be used without considering the limitation of physical resources such as server and storage. In the configuration of the data center, the components of the data center tend to have scale-out architecture. These components are connected by high-speed interconnect in general. Multiple data centers work together, forming a data center federation. In data center operation, Self Service Portal has become mainstream. Resource provisioning is done by service user, not IT administrator. Computing resource and storage resource provide resource pools. Service users can provision their resources from the pool in a flexible manner. For example, US2010/0040058 discloses a server resource pool in a virtualized environment. The frequency of deploy and the frequency of undeploy are increased, especially for test and development environment. US2010/0312893 also discloses a server resource pool in a virtualized environment. US2010/0058009 discloses storage resource pool in a storage system with automated resource allocation.

As to the progress of virtualized technology, over-provisioning has become common. A user can provision the resource more than the amount of a physical resource. This trend is supported by thin provisioning technology, for example. See, e.g., US2004/0162958 for automated on-line capacity expansion method for storage device. Other trends include hot migration of virtual server (e.g., VMware VMotion) and live migration of virtual machine disk file (e.g., VMware Storage VMotion). Some storage systems can use storage resources of other storage subsystems (e.g., External Storage Virtualization). US2004/0143832 discloses such an External Storage Virtualization function whereby a new storage unit is installed such that installation costs are suppressed and functions of the new storage unit can be utilized sufficiently. Some storage subsystems can lease resources of other storage temporarily (e.g., Enhancement of External Storage Virtualization). US2009/0157984 discloses such an Enhancement of External Storage Virtualization whereby a storage system provides virtual ports and is able to transfer the virtual ports among physical ports located on multiple storage control units making up the storage system.

Various resources coexist in one data center, creating a heterogeneous environment. For instance, various performances of IT resources are mixed in one data center. SSD is used as a new storage medium in addition to HDD. Connections of each resource may vary. Some resources are connected via high-speed interconnect; some are not. As to the automation of operation, resources are provisioned by the user, not the administrator. Performance tuning becomes automated.

The current approach has problems. Various operations are performed by various administrators and users such as provisioning, unprovisioning, adding the resources, hot migration of virtual server, and live migration of virtual machine file disk. The efficiency in the use of the resources in the data center drops. For example, some virtual machines may use storage resources of another rack. It is difficult to detect to monitor the virtualized environment. As a result, the following problems can occur: high performance resources are used for low priority application, some virtual machine cannot maintain SLO (Service Level Objective), the bandwidth of interconnect becomes short, etc.

BRIEF SUMMARY OF THE INVENTION

Exemplary embodiments of the invention improve the efficiency in the use of resources in a data center. The proposed approach checks the physical configuration of virtualized resources and specifies the inefficient configuration. Then it provides a migration plan which improves the efficiency in the use of the resources in the data center and executes the plan if the plan satisfies the service level objective. This approach is used for efficient deploy of firmware of server or storage in the data center. It is also used for efficient deploy of the path of virtual machine or application in the data center.

An aspect of the present invention is directed to a method of managing use of resources in a data center which includes a plurality of servers and a plurality of storage subsystems, wherein each server includes at least one virtual machine and at least one file system to be used by the at least one virtual machine, and wherein each storage subsystem includes virtual volumes, physical volumes, and a storage pool. The method comprises: determining whether a first one of the storage subsystems includes a virtual volume or a storage pool that uses a physical volume of a second one of the storage subsystems and, if yes, migrating the physical volume from the second storage subsystem to the first storage subsystem; determining whether any one of the storage subsystems includes a virtual volume that is created directly from a physical volume and, if yes, migrating the virtual volume of the one storage subsystem to another virtual volume that is provisioned from the storage pool of the one storage subsystem; and determining whether all the virtual volumes satisfy a preset service level objective and, (i) if no, then selecting a virtual machine which has a smallest virtual machine disk file and which has not been migrated and selecting a storage pool having a largest free space while excluding the storage subsystem which contains the smallest virtual machine disk file and then selecting a virtual volume of the storage subsystem which has the selected storage pool and, if the largest free space is not smaller than the virtual machine disk file of the selected virtual machine, then migrating the virtual machine disk file of the selected virtual machine to the selected virtual volume, but if the largest free space is smaller than the virtual machine disk file of the selected virtual machine, then sending an error notification, and (ii) if yes, confirming a plan including the migrating steps to be executed for use of resources in the data center.

In some embodiments, the determining steps are performed only after occurrence of an event indicating a need to perform the determining steps to manage the use of resources in the data center, and the method further comprises, after occurrence of the event, collecting configuration information of the servers and the storage subsystems to be used in managing the use of resources in the data center.

In specific embodiments, the data center includes a plurality of converged platforms each having at least one server and at least one storage subsystem which are coupled via an interconnect. The physical volume is migrated from the second storage subsystem to the first storage subsystem only if the first and second storage subsystems are disposed in different converged platforms. If the virtual volumes do not all satisfy the preset service level objective and if the largest free space of the selected storage pool is not smaller than the virtual machine disk file of the selected virtual machine, then migrating the virtual machine and the virtual machine disk file of the selected virtual machine to the converged platform which has the selected storage pool. The method further comprises determining whether any virtual machine and a corresponding virtual volume for storing a virtual machine disk file of the virtual machine are deployed on different converged platforms such that the virtual machine is executed on a different converged platform from the converged platform for the corresponding virtual volume and, if yes, performing migration to place the file system used by the virtual machine and the corresponding virtual volume in the same converged platform. Performing migration comprises one of: (1) if a virtual machine manager for managing the virtual machine has virtual machine live migration function, and the virtual machine can be migrated to the converged platform of the corresponding virtual volume, then migrating the virtual machine to the converged platform of the corresponding virtual volume; (2) if the storage subsystem for the corresponding virtual volume has live volume migration function and the corresponding virtual volume can be migrated to the same converged platform of the virtual machine, then migrating the corresponding virtual volume to the same converged platform of the virtual machine; and (3) if a virtual machine manager for managing the virtual machine has live migration of virtual machine disk file function and the virtual machine disk file of the virtual machine can be migrated to the same converged platform of the virtual machine, then migrating the virtual machine disk file to the same converged platform of the virtual machine. The method further comprises selecting one of migration (1), (2), and (3) which has a minimum cost.

In some embodiments, a plurality of data centers are provided, each data center including a plurality of servers and a plurality of storage subsystems. If the virtual volumes do not all satisfy the preset service level objective and if the largest free space of the selected storage pool is not smaller than the virtual machine disk file of the selected virtual machine, then migrating the virtual machine and the virtual machine disk file of the selected virtual machine to the data center which has the selected storage pool.

In specific embodiments, a plurality of data centers are provided, each data center including a plurality of servers and a plurality of storage subsystems. The method further comprises determining whether any virtual machine and corresponding virtual volume for storing a virtual machine disk file of the virtual machine are deployed on different data centers such that the virtual machine is executed on a different data center from the data center for the corresponding virtual volume and, if yes, performing migration to place the file system used by the virtual machine and the corresponding virtual volume in the same data center. Performing migration comprises one of: (1) if a virtual machine manager for managing the virtual machine has virtual machine live migration function, and the virtual machine can be migrated to the converged platform of the corresponding virtual volume, then migrating the virtual machine to the data center of the corresponding virtual volume; (2) if the storage subsystem for the corresponding virtual volume has live volume migration function and the corresponding virtual volume can be migrated to the same data center of the virtual machine, then migrating the corresponding virtual volume to the same data center of the virtual machine; and (3) if a virtual machine manager for managing the virtual machine has live migration of virtual machine disk file function and a virtual machine disk file of the virtual machine can be migrated to the same data center of the virtual machine, then migrating the virtual machine disk file to the same data center of the virtual machine. The method further comprises selecting one of migration (1), (2), and (3) which has a minimum cost.

Another aspect of this invention is directed to a management device for managing use of resources in a data center which includes a plurality of servers and a plurality of storage subsystems, wherein each server includes at least one virtual machine and at least one file system to be used by the at least one virtual machine, and wherein each storage subsystem includes virtual volumes, physical volumes, and a storage pool. The management device comprises a processor, a memory, and an efficiency improvement module. The efficiency improvement module is configured to: determine whether a first one of the storage subsystems includes a virtual volume or a storage pool that uses a physical volume of a second one of the storage subsystems and, if yes, migrate the physical volume from the second storage subsystem to the first storage subsystem; determine whether any one of the storage subsystems includes a virtual volume that is created directly from a physical volume and, if yes, migrate the virtual volume of the one storage subsystem to another virtual volume that is provisioned from the storage pool of the one storage subsystem; and determine whether all the virtual volumes satisfy a preset service level objective and, (i) if no, then select a virtual machine which has a smallest virtual machine disk file and which has not been migrated and select a storage pool having a largest free space while excluding the storage subsystem which contains the smallest virtual machine disk file and then select a virtual volume of the storage subsystem which has the selected storage pool and, if the largest free space is not smaller than the virtual machine disk file of the selected virtual machine, then migrate the virtual machine disk file of the selected virtual machine to the selected virtual volume, but if the largest free space is smaller than the virtual machine disk file of the selected virtual machine, then send an error notification, and (ii) if yes, confirm a plan including the migrating steps to be executed for use of resources in the data center.

In some embodiments, if the virtual volumes do not all satisfy the preset service level objective and if the largest free space of the selected storage pool is not smaller than the virtual machine disk file of the selected virtual machine, then the efficiency improvement module instructs to migrate the virtual machine and the virtual machine disk file of the selected virtual machine to the converged platform which has the selected storage pool. The efficiency improvement module determines whether any virtual machine and corresponding virtual volume for storing a virtual machine disk file of the virtual machine are deployed on different converged platforms such that the virtual machine is executed on a different converged platform from the converged platform for the corresponding virtual volume and, if yes, instructs to perform migration to place the file system used by the virtual machine and the corresponding virtual volume in the same converged platform.

In specific embodiments, a plurality of data centers are provided, each data center including a plurality of servers and a plurality of storage subsystems. If the virtual volumes do not all satisfy the preset service level objective and if the largest free space of the selected storage pool is not smaller than the virtual machine disk file of the selected virtual machine, then the efficiency improvement module instructs to migrate the virtual machine and the virtual machine disk file of the selected virtual machine to the data center which has the selected storage pool.

These and other features and advantages of the present invention will become apparent to those of ordinary skill in the art in view of the following detailed description of the specific embodiments.

BRIEF DESCRIPTION OF THE DRAWINGS

FIG. 6 shows an example of the Configuration Information Table in the Management Server according to the first embodiment.

FIG. 8 shows an example of the Pool Configuration Table in the Management Server.

FIG. 9 shows an example of the Media Performance Table in the Management Server.

FIG. 14 shows an example of the Configuration Information Table in the Management Server according to the second embodiment.

FIG. 19 shows an example of the Configuration Information Table in the Management Server according to the third embodiment.

DETAILED DESCRIPTION OF THE INVENTION

Figure 1:
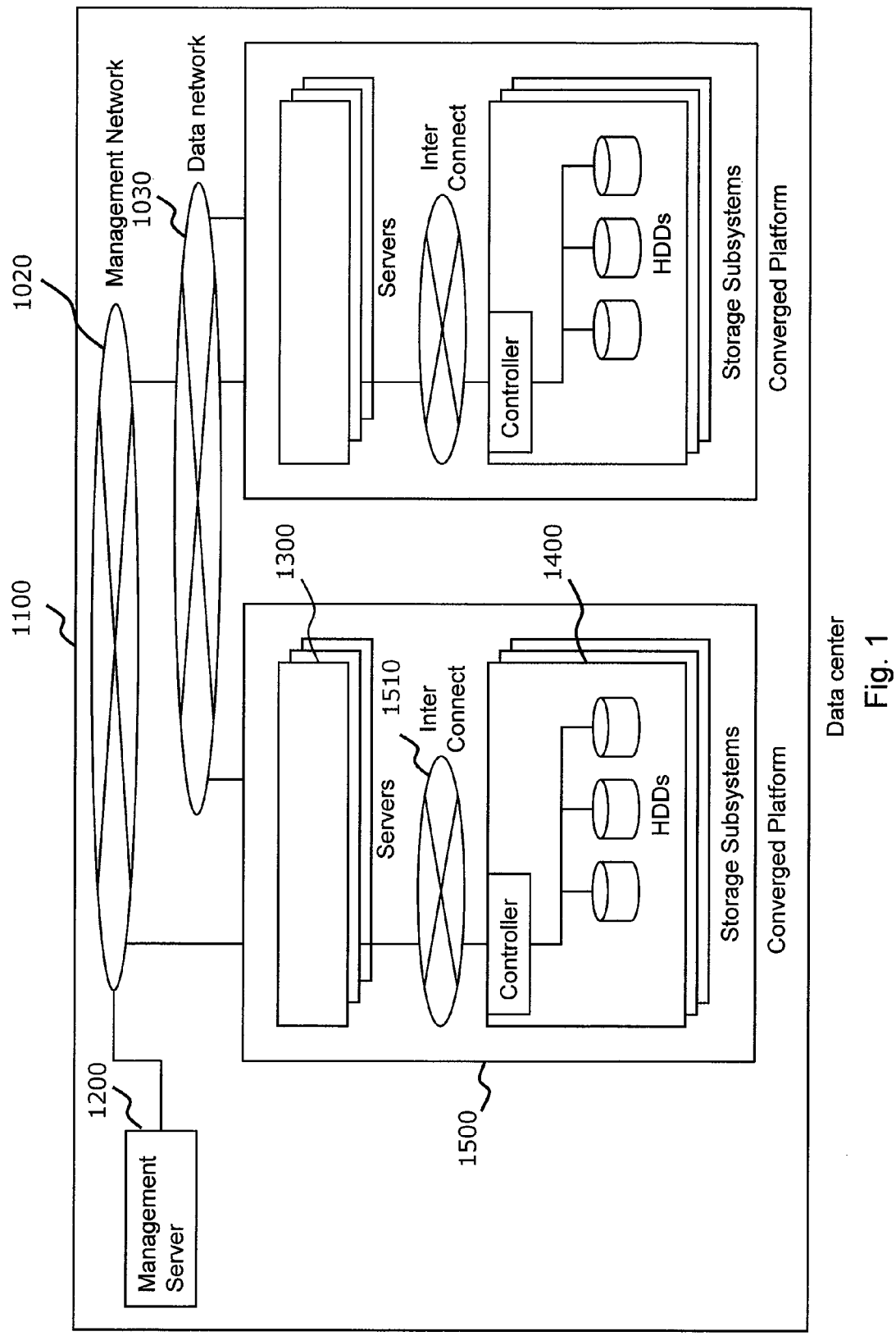
FIG. 1 illustrates an example of a hardware configuration of a data center system in which the method and apparatus of the invention may be applied according to the first embodiment.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for improving the efficiency in the use of resources in a data center.

First Embodiment

The first embodiment discloses how to improve the efficiency in the use of resources in a data center.

FIG. 1 illustrates an example of a hardware configuration of a data center system in which the method and apparatus of the invention may be applied according to the first embodiment. A data center 1100 includes a Converged Platform 1500 and a Management Server 1200. The Converged Platform 1500 is one of the hardware configurations which include servers, networks, and storages all-in-one. The Converged Platform 1500 is configured with Servers 1300, Storage Subsystems 1400, and Interconnect 1510. Multiple Converged Platforms 1500 are connected via a Data Network 1030. The Converged Platforms 1500 and Management Server 1200 are connected via a Management Network 1020. In this embodiment, the Management Network 1020 and Data Network 1030 are separate. This specific configuration does not limit the scope of the present invention.

Figure 2:
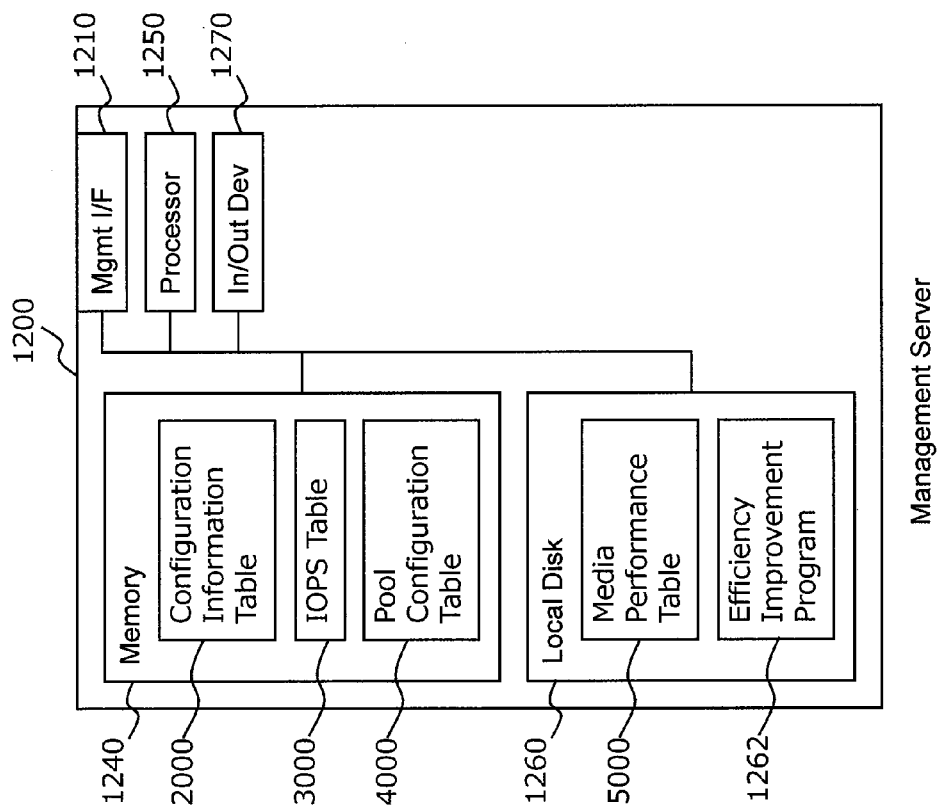
FIG. 2 shows an example of the configuration of the Management Server in the data center.

FIG. 2 shows an example of the configuration of the Management Server 1020 in the data center 1100. A Management Interface 1210 is an interface to the Management Network 1020. An Input/Output Device 1270 is a user interface such as monitor, keyboard, and mouse. A Local Disk 1260 contains a Media Performance Table 5000 and an Efficiency Improvement Program 1262. The Efficiency Improvement Program 1262 is loaded to a Memory 1240 and executed by a Processor 1250. The procedure of the Efficiency Improvement Program 1262 is discussed below (see FIG. 10).

Figure 3:
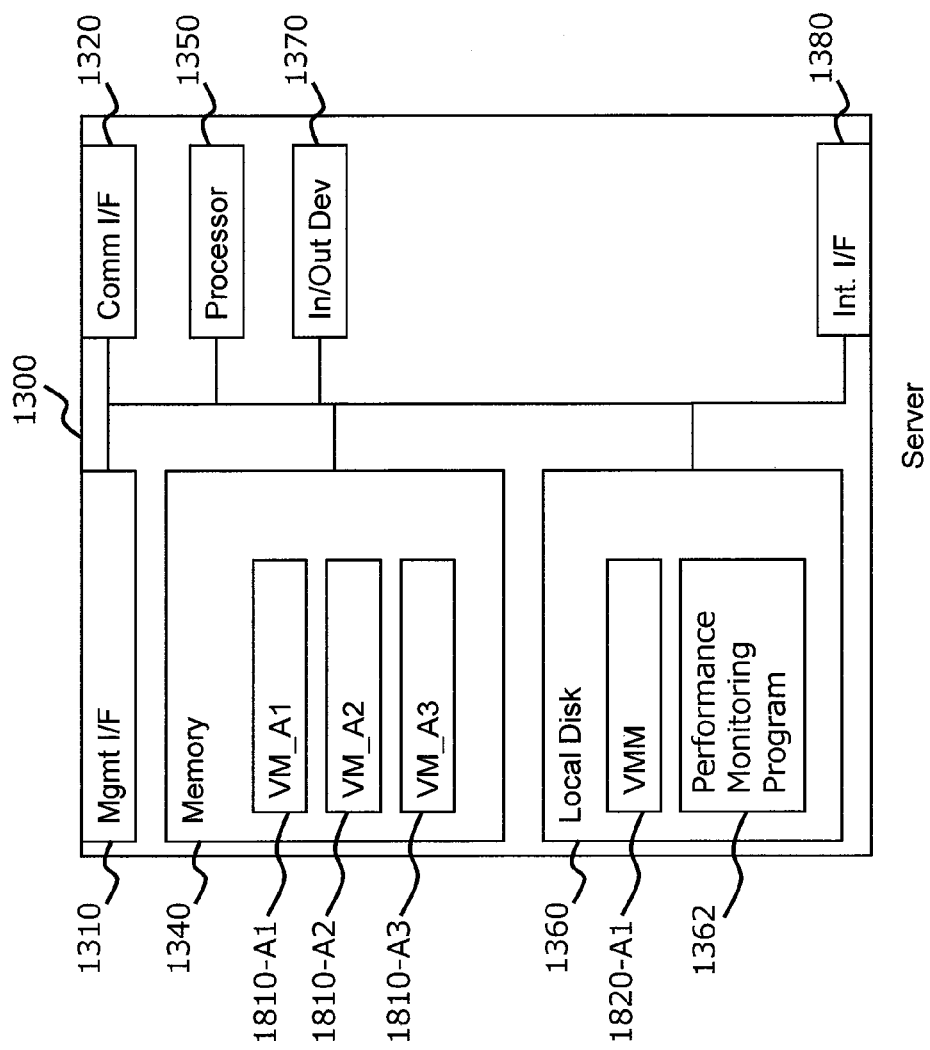
FIG. 3 shows an example of the configuration of the Server in the data center.

FIG. 3 shows an example of the configuration of the Server 1300 in the data center 1100. A Management Interface 1310 is an interface to the Management Network 1020. A Communication Interface 1320 is an interface to the Data Network 1030. An Internal Interface 1380 is an interface to the Interconnect 1510. A Local Disk 1360 contains a Virtual Machine Manager (VMM) 1820-A1 and a Performance Monitoring Program 1362. The VMM is loaded to a Memory 1340 and executed by a Processor 1350. In this embodiment, the VMM is loaded from the Local Disk 1360, but the invention is not limited to this. For example, the VMM can be loaded from the Storage Subsystems 1400. In this case, the Server 1300 does not have to be equipped with the Local Disk 1360. The procedure of the Performance Monitoring Program 1362 is discussed below (see FIG. 10). The Memory 1340 contains virtual machines. In this embodiment, VM_A1 1840-A1, VM_A2 1840-A2 and VM_A3 1840-A3 are loaded from the Storage Subsystems 1400 and executed by the Processor 1350 on the VMM 1820-A1.

Figure 4:
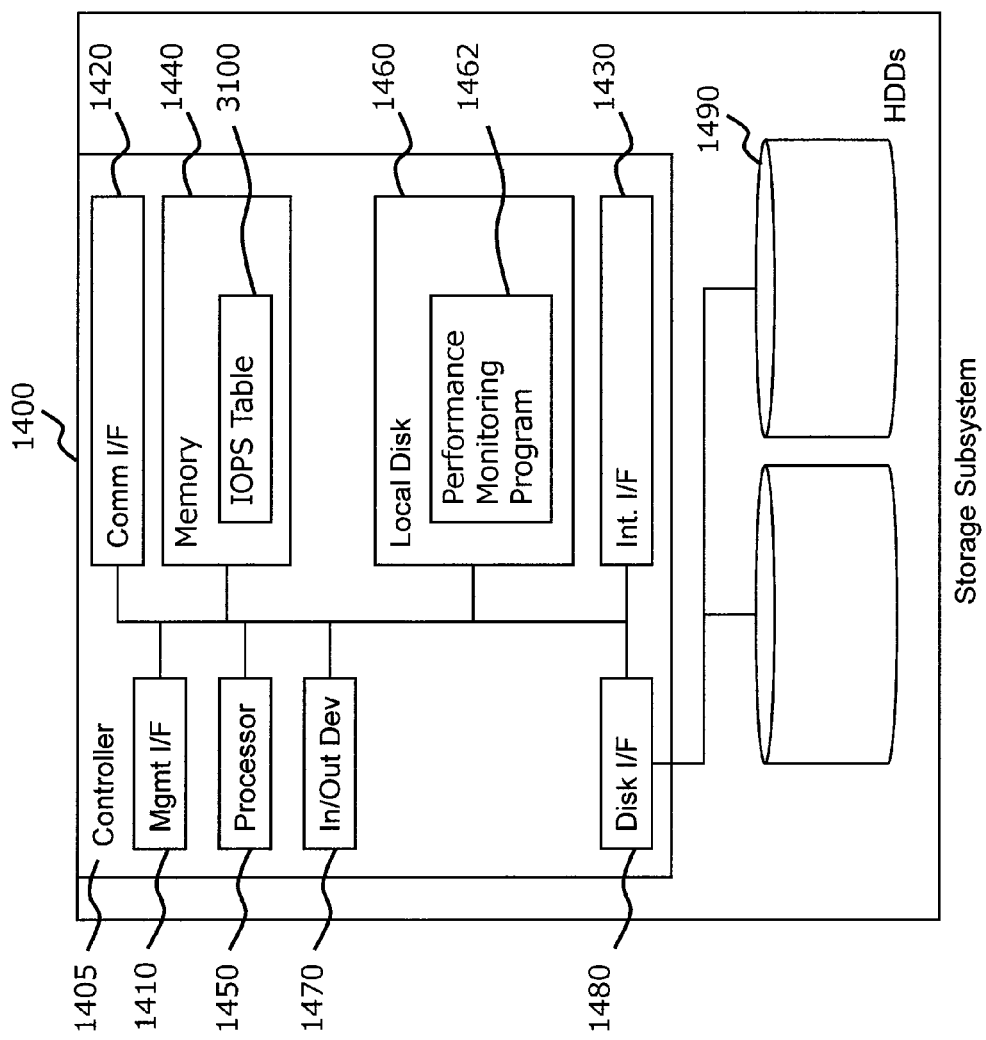
FIG. 4 shows an example of the Configuration of the Storage Subsystem in the data center.

FIG. 4 shows an example of the configuration of the Storage Subsystem 1400 in the data center 1100. The Storage subsystem 1400 has a Controller 1405 and HDDs 1490. The Controller 1405 has a Management Interface 1410, a Communication Interface 1420, a Memory 1440, a Processor 1450, a Local Disk 1460, an Input/Output Device 1470, a Disk Interface 1480, and an Internal Interface 1430. The Management Interface 1410 is an interface to the Management Network 1020. The Communication Interface 1420 is an interface to the Data Network 1030. The Disk Interface 1480 is an interface to the HDDs 1490. A Performance Monitoring Program 1462 is loaded to the Memory 1440 and executed by the Processor 1450. This program monitors the IOPS (Input/Output Operations Per Second) of each page of the Virtual Volumes and then creates an IOPS Table 3100. Detailed configuration of the IOPS table 3100 is discussed below (see FIG. 7). The HDDs contain several HDDs (Hard Disk Drives). In FIG. 4, two HDDs are depicted, but the number is not limited two. The Disks are not limited to HDDs. SSDs (Solid State Disks) and some other media can be used. Additionally, various HDDs such as SAS and SATA and SSDs can be mixed.

Figure 5:
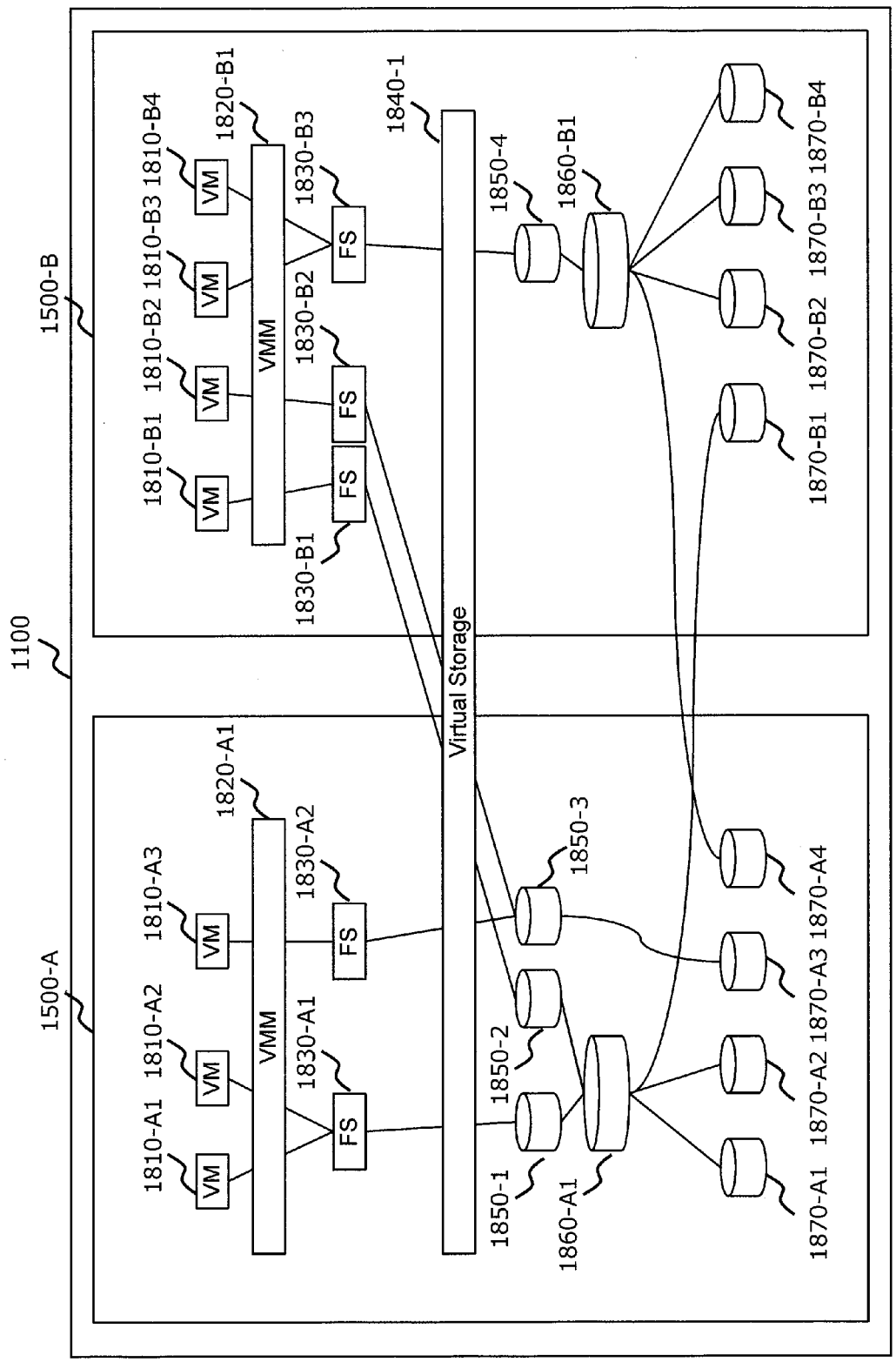
FIG. 5 shows an example of the logical configuration of the data center system according to the first embodiment.

FIG. 5 shows an example of the logical configuration of the data center system 1100 according to the first embodiment. It shows the logical configuration of the system from Virtual Machine to Physical Volume according to the first embodiment. The Virtual Machine (VM) 1810 is executed on the Virtual Machine Manager (VMM) 1820. The VM uses the File System of virtual machine (FS) 1830. The image of the virtual machine is stored in the storage subsystem 1400 and loaded into the server 1300. Multiple VMs can be deployed on one VMM. Multiple VMs can use one FS 1830. In this embodiment, seven VMs are deployed in one data center, but the invention is not limited to this.

The FS 1830 uses the Virtual Volumes 1850. The FS can use virtual volumes of another converged platform. The FS can use multiple Virtual Volumes. In this embodiment, four virtual volumes are created in one data center, but the invention is not limited to this. The Virtual Storage 1840-1 virtualizes the multiple storages into a single virtualized storage. The Virtual Volume is created from the Storage Pool 1860 or Physical Volume 1870. The Virtual Volume can have Thin Provisioning function or Dynamic Tiering function. In this embodiment, the Virtual Volume 1850-3 is created from one Physical Volume 1870-A3, but the invention is not limited to this. The Virtual Volume can be created from multiple Physical Volumes. The Physical Volume 1870 is a physical medium such as various HDDs or SSDs. It can be a RAID group which includes multiple media.

In the first embodiment, there are four reasons of degrading the resource efficiency. First, FS 1830-B1 uses Virtual Volume 1850-2 of another Converged Platform. This situation happens in case there is little capacity in the internal Storage Pool when provisioning. Storage access between converged platforms is inefficient. Second, FS 1830-B2 uses Virtual Volume 1850-3 of another Converged Platform. The VMs 1820-A3 and 1820-B2 share Virtual Volume 1850-3, and two VMs are at work on each FS. This situation happens by live migration of VM. The objective of live migration may be load balancing. Storage access between converged platforms is inefficient. Third, Virtual Volume 1850-3 is directly created from a Physical Volume, not from a Pool. It is insufficient because such a Virtual Volume cannot share the capacity with another Virtual Volumes. Fourth, Pool 1860-A1 uses Physical Volume 1870-B1 of another Converged Platform. In a similar way, Pool 1860-B1 uses Physical Volume 1870-A4 of another Converged Platform. This situation happens in case there is no volume which satisfies the performance or capacity requirements in the internal Storage Pool or Physical Volumes. Storage access between converged platforms is inefficient. In the first embodiment, there are four reasons that degrade the resource efficiency, but not all the reasons are mandatory.

FIG. 6 shows an example of the Configuration Information Table 2000 in the Management Server 1200 according to the first embodiment. The table is created in the Management Server's Memory 1240 by the Efficiency Improvement Program 1262. This table shows the logical mapping relationship from Virtual Machine to Physical Volume. A Virtual Machine Name row 2110 shows the identification of each virtual machine 1810 in the data center 1100. A Virtual Machine Manager ID row 2120 shows the identification of each VMM 1820 in the data center 1100. A File System of VMM ID row 2130 shows the identification of each File System of VMM 1830 in the data center 1100. A Converged Platform ID of VM row 2135 shows the identification of the converged platform on which the virtual machine of this column is executed. For example, column 2005 shows virtual machine VM_A1 is executed on converged platform 1500-A. This identification can be a serial number of the converged platform. A Virtual Subsystem ID row 2140 shows the identification of each Virtual Subsystem 1840 in the data center 1100. This identification can be a serial number of the subsystem. A Virtual Volume ID row 2150 shows the identification of each Virtual Volume 1850 in the data center 1100. This identification can be a logical unit number of the volume. A Converged Platform ID of Virtual Volume row 2155 shows the identification of the converged platform on which the virtual volume exists. For example, column 2005 shows virtual volume VVOL_1 exists on converged platform 1500-A. A Pool ID row 2160 shows the identification of each Pool 1860 in the data center 1100. A Physical Volume ID row 2170 shows the identification of each Physical Volume 1870 in the data center 1100. This identification can be a RAID group number of the physical volumes or logical unit numbers of the volumes. Additionally, this field has the tier number and the number of pages of each Physical Volume. Tier information is decided by the Efficiency Improvement Program 1262 using the Performance Monitoring Program 1362 in each Server 1300. Page information is derived from each storage subsystem 1400. A Converged Platform ID of Physical Volume row 2175 shows the identification of the converged platform on which the physical volume exists. For example, column 2015 shows physical volume RG_B1 exists on converged platform 1500-B.

Figure 7:
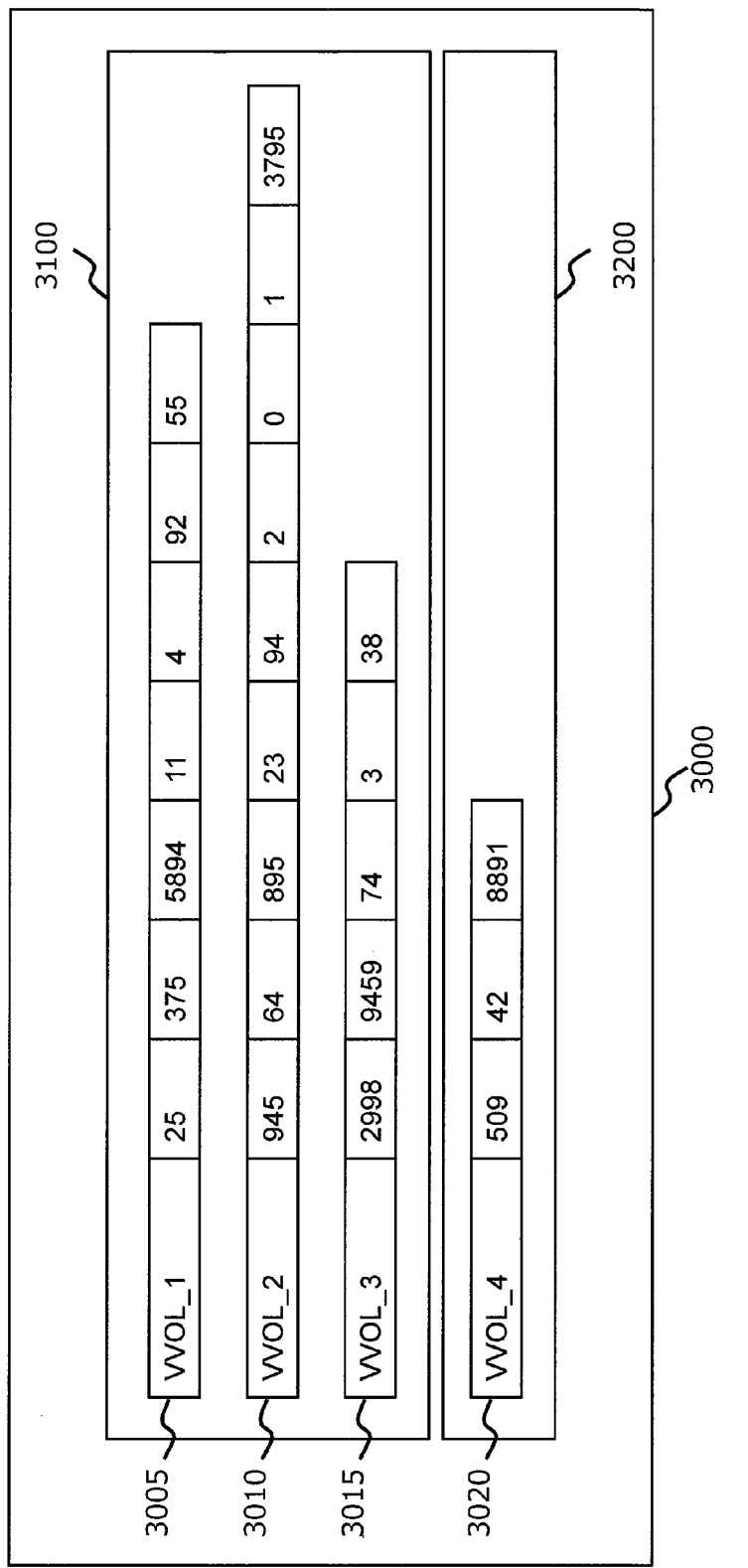
FIG. 7 shows an example of the IOPS Table in the Management Server.

FIG. 7 shows an example of the IOPS Table 3000 in the Management Server 1200. It shows the IOPS Table 3000 created in the Management Servers Memory 1240 by the Efficiency Improvement Program 1262. Each Storage Subsystem 1400 creates a subset IOPS table 3100 by the Performance Monitoring Program 1462. The Efficiency Improvement Program 1262 collects all of the subset IOPS tables 3100 and then creates the IOPS Table 3000. Each row shows the IOPS of each page of the Virtual Volume. For example, row 3005 shows Virtual Volume VVOL_1 has seven pages and IOPS of the pages are 25, 375, 5894, 11, 4, 92, and 55.

FIG. 8 shows an example of the Pool Configuration Table 4000 in the Management Server 1200. Each row is a configuration of a Pool 1860. For example, row 4005 shows Pool_A1 has 100 pages of Tier 1 4105, 600 pages of Tier 2 4110, and 1300 pages of Tier 3 4115. This table is created by the Efficiency Improvement Program 1262.

FIG. 9 shows an example of the Media Performance Table 5000 in the Management Server 1200. Each row defines the performance of each Tier. For example, row 5005 defines Tier 1. The Average Response Time 5105 of Tier 1 is 0.05 msec and the Response Time Range 5110 of Tier 1 is between 0 and 0.10 msec.

Figure 10:
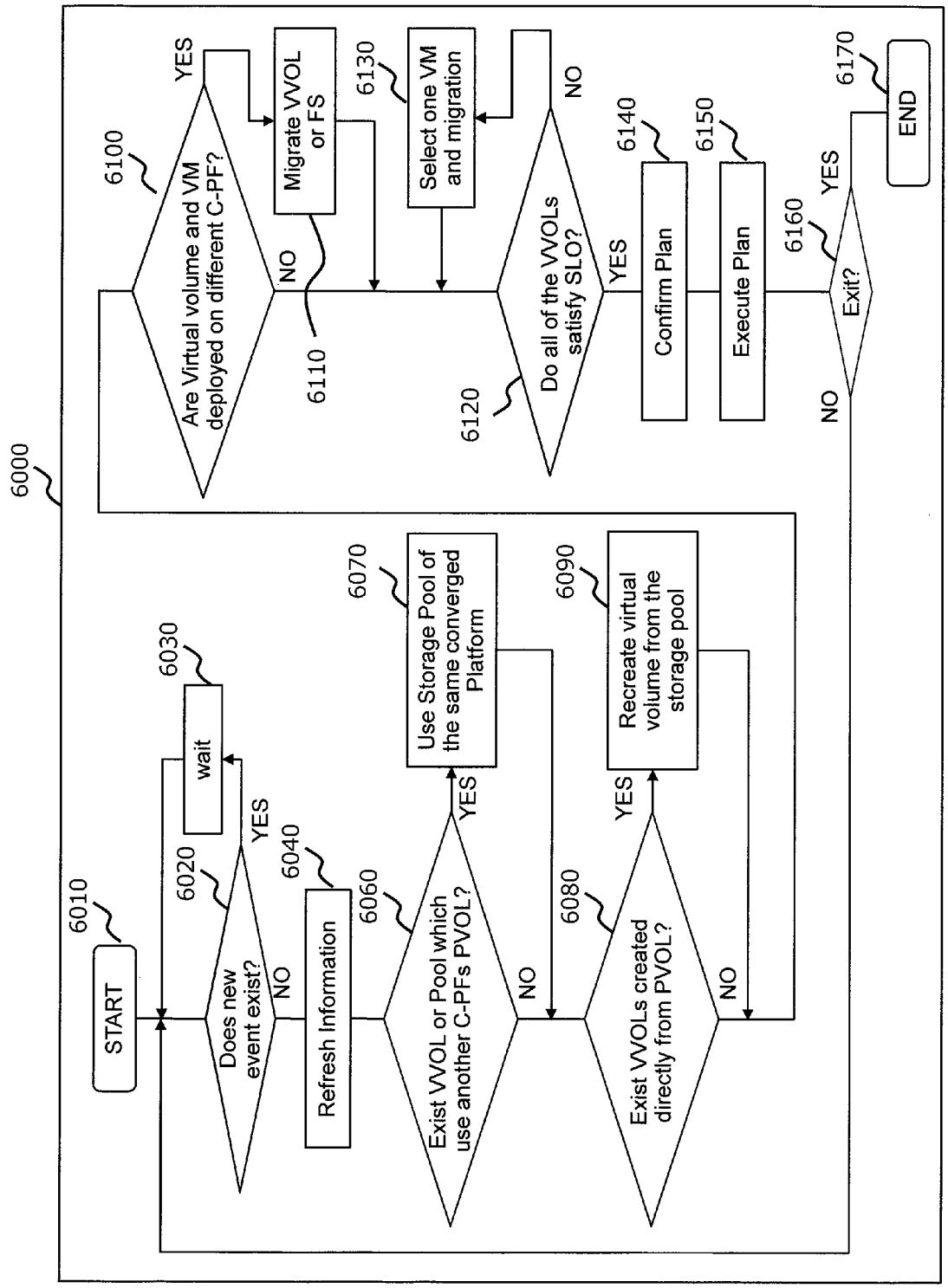
FIG. 10 shows an example of a flow diagram of the Efficiency Improvement Program in the Management Server according to the first embodiment.

FIG. 10 shows an example of a flow diagram of the Efficiency Improvement Program 1262 in the Management Server 1200 according to the first embodiment. The program starts in step 6010. In step 6020, the program determines whether a new event has arrived or not. If a new event has arrived, the program proceeds to step 6040; otherwise, it proceeds to step 6030. In the first embodiment, there are three events, but not all the events are mandatory. The first is direction from the user. The second is periodic. In this case, the program deploys the timer program in the Management Server 1200, and then notifies the event. The third is threshold. The program sets the threshold in advance. For example: 20% of the physical volumes are used by the Servers 1300 from another converged platform. One of the VMs exceeds 80% of the SLO response time, and 70% of the data network bandwidth is consumed.

In step 6030, the program waits for a while, and then goes to step 6020. In step 6040, the program refreshes the information in the Management Server 1200. In this embodiment, three tables are refreshed. The first is the Configuration Information Table 2000. The Efficiency Improvement Program 1262 collects configuration information from all the servers 1300 and all the storage subsystems 1400 in the data center 1100, and then creates the Configuration Information Table 2000. At this time, the Tier of the Physical Volume 2170 is not yet decided. The second is the IOPS Table 3000. Each storage subsystem 1400 has a subset of the IOPS Table. The Efficiency Improvement Program 1262 collects the subsets and then creates the IOPS Table 3000. The third is the Pool Configuration Table 4000. The page number of each physical volume which composes the storage pool is derived from the storage subsystem. The tier is decided per each physical volume. The program gets the actual response time by using the Performance Monitoring Program 1362 of the Server 1300. The tier of each physical volume is decided by comparing the actual response time and the Response Time Range 5110 of the media performance table 5000. The decided tier information is recorded to the Configuration Information Table 2000. It is possible to become a different performance even by the same media. For example, the SSD of the same converged platform is Tier 1 but the SSD of another converged platform maybe Tier 2. Therefore the tier should be defined by actual performance.

The following step 6060 to step 6120 involve creating the plan to improve the efficiency in the use of resources in the data center. This plan is not executed until step 6150.

In step 6060, the program checks whether the virtual volume or pool which uses physical volumes of another converged platform exists. This check is done by comparing row 2155 and row 2175 of the Configuration Information Table 2000. If the physical volumes of another converged platform are used, the program goes to step 6070; otherwise it goes to step 6080. In step 6070, the Physical Volume which is used for the virtual volume or pool of another converged platform migrates to the pool of the same converged platform. The program then proceeds to step 6080. In step 6080, the program checks whether the Virtual Volume which is created directly from Physical Volumes exists. This check is done by looking up the Pool ID row 2160 of the Configuration Information Table 2000. If this field is '-', it means this virtual volume is created directly from physical volumes. For example, the Pool ID of the virtual volume VVOL_3 is '-', and hence VVOL_3 is created directly from physical volumes. If the virtual volumes directly created from physical volumes exist, the program goes to step 6090; otherwise, it goes to Step 6100. In step 6090, the virtual volumes directly created from Physical Volumes migrate to the new Virtual Volumes provisioned from the Storage Pool. The program then proceeds to step 6100.

In step 6100, the program checks whether the Virtual Volume and Virtual Machine are deployed on the same converged platform. This check is done by comparing row 2135 and row 2155 of the Configuration Information Table 2000. If these fields are different, this virtual machine is executed on a different converged platform. For example, virtual machine VM_B1 is executed on converged platform 1500-B and virtual volume VVOL_2 is located on converged platform 1500-A. Therefore, these two elements are located on different converged platforms. If the virtual volume and virtual machine are on the same converged platform, the program goes to step 6120; otherwise, it goes to step 6110. In step 6110, the VVOL and FS are migrated to the same converged platform using one of the following three procedures. First, if the VMM has VM live migration function (such as VMotion) and VM can be migrated to the same converged platform of its virtual volume, then the VM is moved. Second, if the storage subsystem has live volume migration function and virtual volume can be migrated to the same converged platform of its VM, then the virtual volume is moved. Third, if the VMM has live migration of virtual machine disk file function (such as Storage VMotion) and virtual machine disk file can be migrated to the same converged platform of its VM, then the Virtual Machine disk file is moved. Furthermore, if the Efficiency Improvement Program can execute multiple procedures, it should select the procedure with the minimum cost. For example, if cost of execution is first procedure<second procedure<third procedure, and any of the procedures can be executed, the first procedure should be selected. After step 6110, the program proceeds to step 6120.

In step 6120, the program checks whether all of the virtual volumes satisfy the SLO. A plan is created from step 6060 to step 6110. In this plan, all the virtual servers and their virtual volumes are located on the same converged platform. Based on this created plan, the number of pages of each tier of each storage pool can be calculated. By using this information and the IOPS table 3000, the Efficiency Improvement Program 1262 can estimate the number of pages of each tier assigned to each virtual volume. Based on this information and the average response time 5105 in the Media Performance Table 5000, the Efficiency Improvement Program 1262 can calculate the response time of each virtual volume. Although it is not shown in the drawings, there is an SLO table in the Memory 1240 of the Management Server 1200. The SLO table contains the SLO of each virtual volume. The SLO is the average response time, for example. The Efficiency Improvement Program 1262 compares this SLO and the calculated response time. If all the calculated response times of the Virtual Volumes satisfy the SLO, the program goes to step 6140; otherwise it goes to step 6130.

In step 6130, the program selects a virtual machine which has a smallest virtual machine disk file and which is not migrated in this step. The program selects one converged platform which has a largest free space of storage pool as a destination. If the free space of the selected storage pool is smaller than the selected virtual machine disk file, the Efficiency Improvement Program 1262 notifies the error and exits this program flow diagram; otherwise, as a modified plan, the selected virtual machine and its virtual machine disk file are migrated to the selected converged platform. The program then proceeds to step 6120. In step 6140, the program provides the created plan to the user. The user can select immediate execution or scheduled execution of the plan. If scheduled execution is specified, the program registers the plan to the scheduler. In step 6150, the program executes the created plan. In step 6160, the program checks whether there is termination indication by the user. If termination indication exists, the program goes to step 6170; otherwise, it goes to step 6020. The program ends in step 6170.

Figure 11:
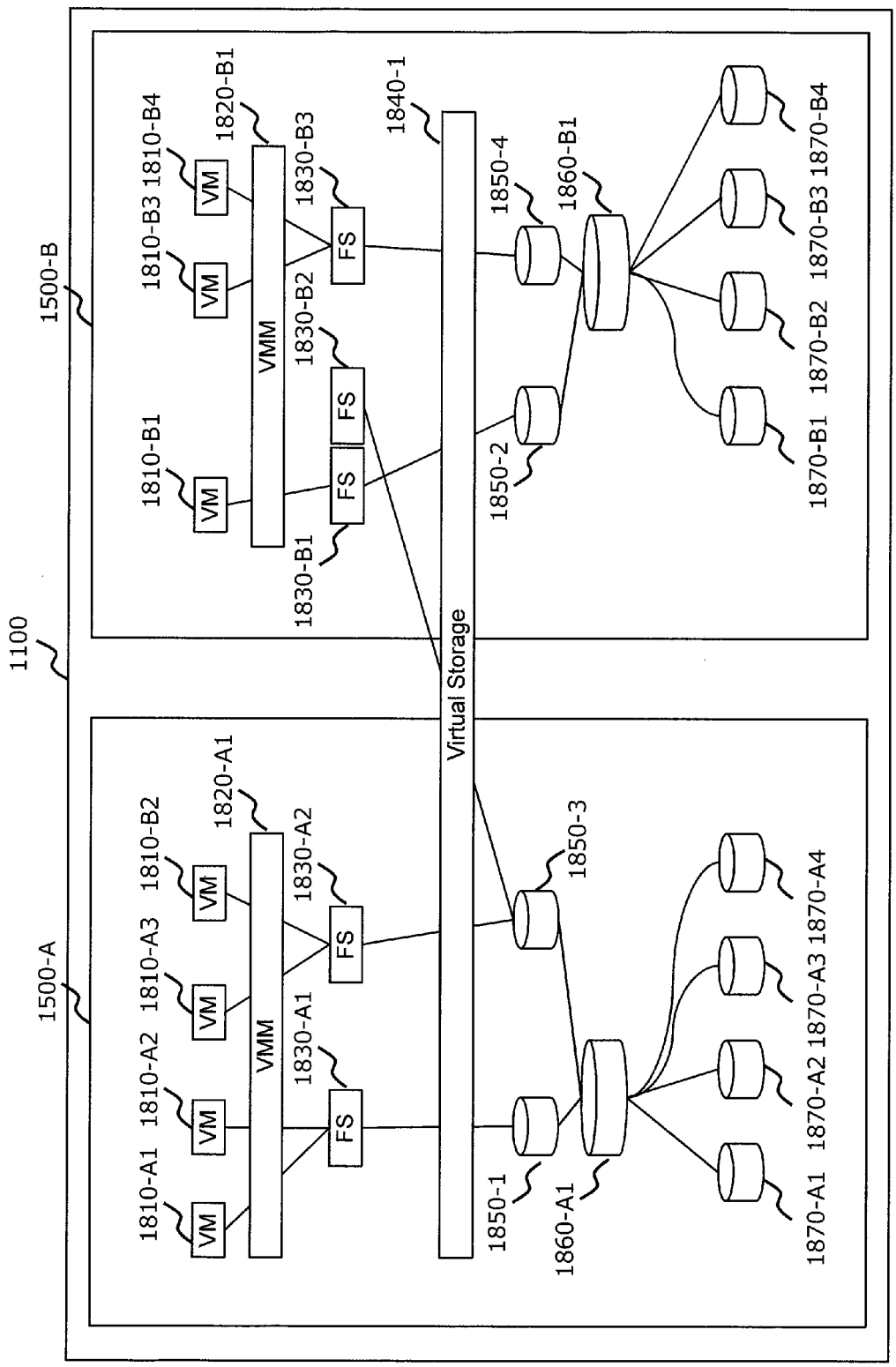
FIG. 11 shows an example of the logical configuration of the data center system after execution of the Efficiency Improvement Program according to the first embodiment.

FIG. 11 shows an example of the logical configuration of the data center system after execution of the Efficiency Improvement Program 1262 according to the first embodiment. As a result of efficiency improvement, all the File Systems of the virtual machine use the Virtual Volume of the same converged platform. The created plan has the following features. Based on step 6070, Physical Volume 1870-A3 is connected to Storage Pool 1860-A1, Physical Volume 1870-A4 is connected to Storage Pool 1860-A1, and Physical Volume 1870-B1 is connected to Storage Pool 1860-B1. Based on step 6090, Virtual Volume 1850-3 is connected to Storage Pool 1860-A1. Based on step 6110, Virtual Volume 1850-2 is migrated to Converged Platform 1500-B by using the live volume migration function of storage subsystem, and Virtual Machine 1810-B2 is migrated to Converged Platform 1500-A by using the VM live migration function of VMM. The target of the first embodiment is one data center, but this invention can be applied to multiple data centers as well.

Second Embodiment

The target configuration of the first embodiment is a converged platform. Even if the target configuration is not a converged platform, this invention can be applied. The second embodiment discloses how to improve efficiency in the use of resources in a data center which has a non-converged platform environment. The system configuration and procedure are almost the same as those of the first embodiment. The following explains only the differences with the first embodiment.

Figure 12:
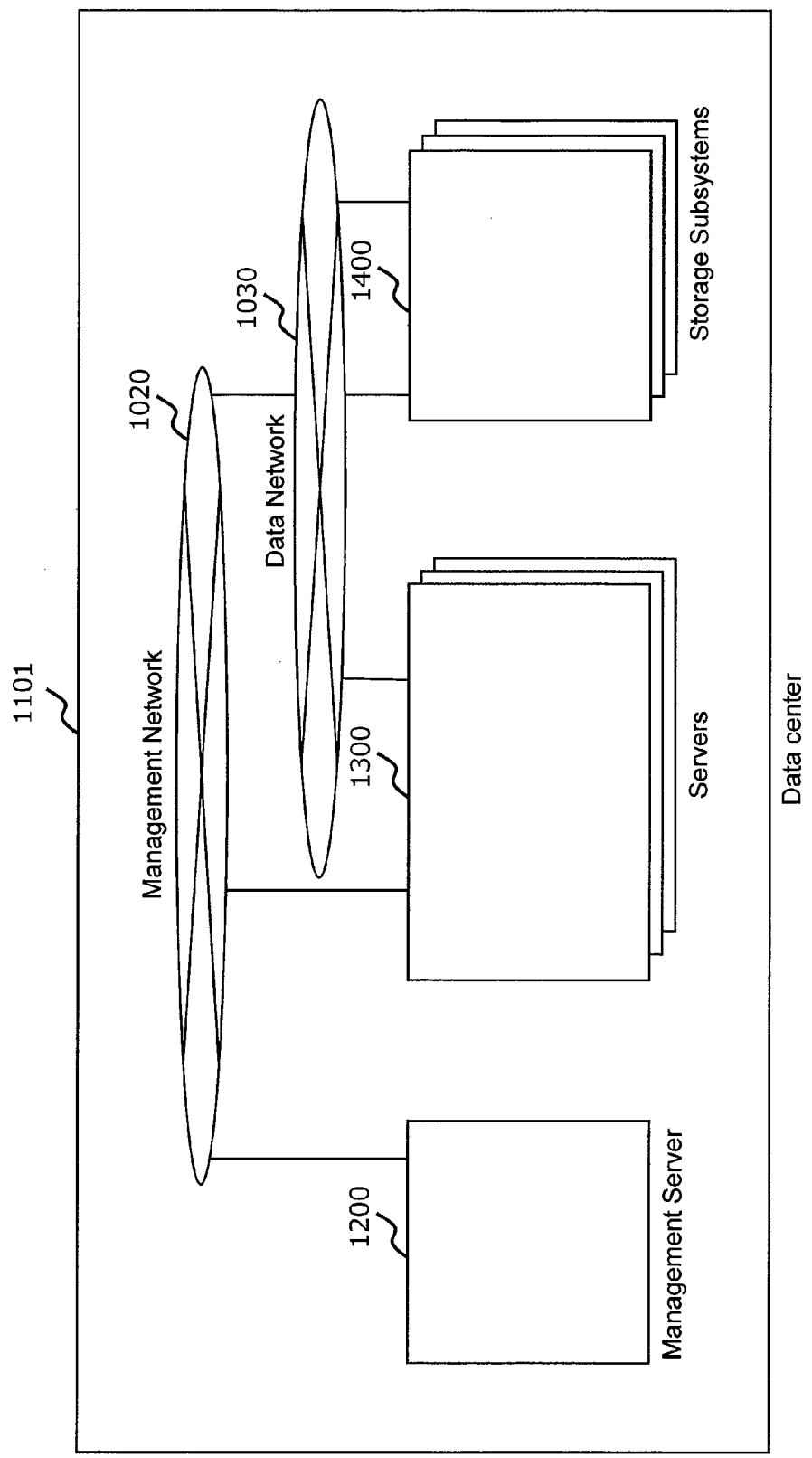
FIG. 12 illustrates an example of a hardware configuration of a data center system according to the second embodiment.

FIG. 12 illustrates an example of a hardware configuration of a data center system according to the second embodiment. The data center 1101 includes Servers 1300, Storage Subsystems 1400, and Management Server 1200. The Servers 1300 and Storage Subsystems 1400 are connected via a Data Network 1030. This network is typically a SAN (Storage Area Network), but it is not limited to this. The Servers 1300, Storage Subsystems 1400, and Management Server 1200 are connected via a Management Network 1020. This network is typically an Ethernet LAN, but it is not limited to this. In this embodiment, the Management Network and Data Network are separate, but it is not limited to this. The configuration of the Management Server 1200 is the same as that of the first embodiment. The configuration of the Server 1300 is almost the same as that of the first embodiment. The only difference is that the Server 1300 of this embodiment does not have an Internal Interface 1380. The configuration of the Storage Subsystem 1400 is almost the same as that of the first embodiment. The only difference is that the Storage Subsystem 1400 of this embodiment does not have an Internal Interface 1430.

Figure 13:
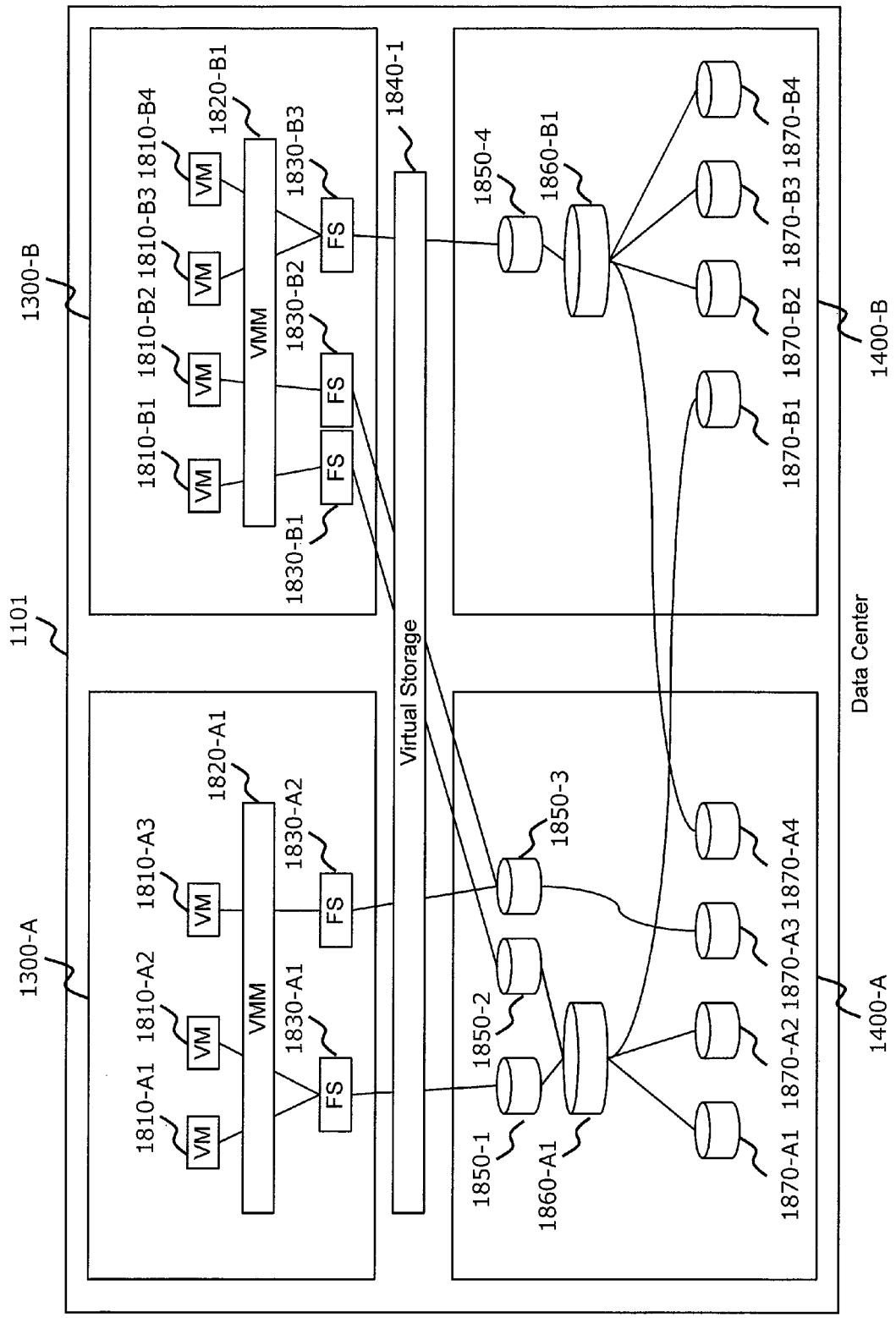
FIG. 13 shows an example of the logical configuration of the data center system according to the second embodiment.

FIG. 13 shows an example of the logical configuration of the data center system 1100 according to the second embodiment. It shows the logical configuration of the system from Virtual Machine to Physical Volume. This configuration is almost the same as the configuration of the first embodiment. The differences are that the virtual machines, virtual machine managers, and file systems of the virtual machine are located on a specific server, and that the virtual volumes and storage pools and physical volumes are located on a specific storage subsystem.

FIG. 14 shows an example of the Configuration Information Table 2001 in the Management Server 1200 according to the second embodiment. It shows the Configuration Information Table 2001 created in the Management Servers Memory 1240 by the Efficiency Improvement Program 1262. This table shows the logical mapping relationship from Virtual Machine to Physical Volume. This configuration is almost the same as the configuration of the first embodiment. There are three differences. First, the Server ID of VM row 2137 shows the identification of the server on which the virtual machine of this column is executed. This identification can be an IP Address. For example, column 2007 shows virtual machine VM_A1 is executed on server 1300-A. Second, the Subsystem ID of Virtual Volume row 2157 shows the identification of subsystem on which the virtual volume exists. This identification can be a serial number of the subsystem. For example, column 2007 shows virtual volume VVOL_1 exists on subsystem 1400-A. Third, the Subsystem ID of Physical Volume row 2177 shows the identification of the converged platform on which the physical volume exists. For example, column 2017 shows physical volume RG_B1 exists on subsystem 1400-B.

The configuration of the IOPS Table 3000 in the Management Server 1200 is the same as that of the first embodiment. The configuration of the Pool Configuration Table 4000 in the Management Server 1200 is the same as that of the first embodiment. The configuration of the Media Performance Table 5000 in the Management Server 1200 is the same as that of the first embodiment.

Figure 15:
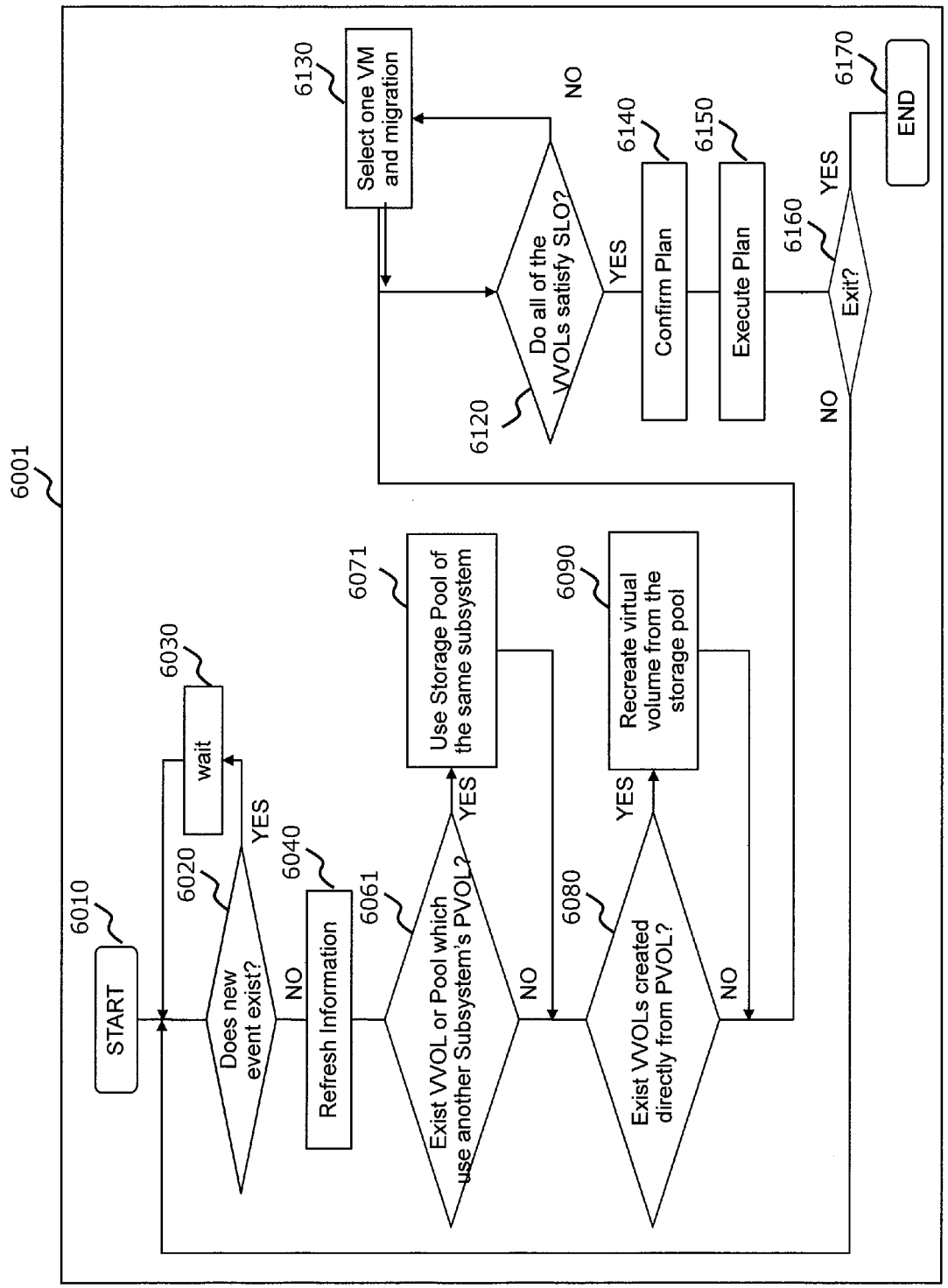
FIG. 15 shows an example of a flow diagram of the Efficiency Improvement Program in the Management Server according to the second embodiment.

FIG. 15 shows an example of a flow diagram of the Efficiency Improvement Program 1262 in the Management Server 1200 according to the second embodiment. Steps 6010, 6020, and 6030 are the same as those of the first embodiment. In step 6040, the only different from the first embodiment is that at the end of the procedure, the program goes to step 6061 instead of step 6060. In step 6061, the program checks whether the virtual volume or pool which uses physical volumes of another storage subsystem exists. This check is done by comparing row 2157 and row 2177 of the Configuration Information Table 2001. If the physical volumes of another storage subsystem are used, the program goes to step 6071; otherwise, it goes to step 6080. In step 6071, the Physical Volume which is used for virtual volume or pool of another storage subsystem migrates to the pool of the same storage subsystem. The program then proceeds to step 6080. Step 6080 and step 6090 are almost the same as those of the first embodiment. The only difference is that at the end of the procedure, the program goes to step 6120 instead of step 6100. Steps 6120, 6130, 6140, 6150, 6160, and 6170 are the same as those of the first embodiment. For step 6130, as a modified plan, the selected virtual machine is not migrated but only its virtual machine disk file is migrated to the storage subsystem having the selected storage pool with the largest free space, if the largest free space is not smaller than the virtual machine disk file of the selected virtual machine. More specifically, a virtual volume is selected from the storage subsystem containing the largest free space of the selected storage pool, and the virtual machine disk file of the selected virtual machine is migrated to the selected virtual volume. In selecting a storage pool with the largest free space, the storage subsystem which contains the smallest virtual machine disk file is excluded.

Figure 16:
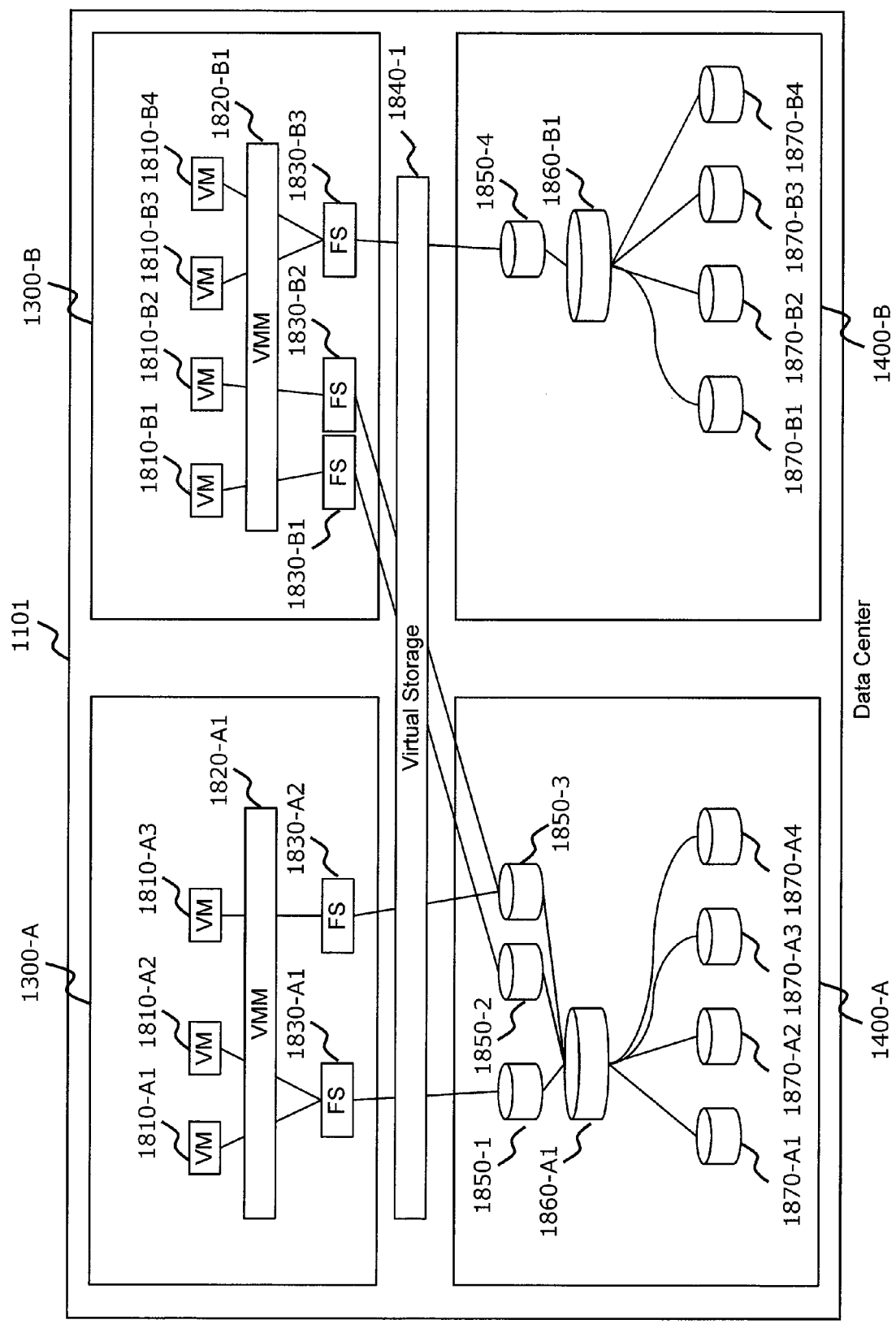
FIG. 16 shows an example of the logical configuration of the data center system after execution of the Efficiency Improvement Program according to the second embodiment.

FIG. 16 shows an example of the logical configuration of the data center system after execution of the Efficiency Improvement Program 1262 according to the second embodiment. As a result of efficiency improvement, all the virtual volumes are provisioned storage pool of the same storage subsystem. Additionally, all the storage pools are configured from physical volumes of the same storage subsystem. The created plan has the following features. Based on step 6071, Physical Volume 1870-A3 is connected to Storage Pool 1860-A1, Physical Volume 1870-A4 is connected to Storage Pool 1860-A1, and Physical Volume 1870-B1 is connected to Storage Pool 1860-B1. Based on step 6090, Virtual Volume 1850-3 is connected to Storage Pool 1860-A1.

Third Embodiment

The target of the second embodiment is one data center. Even if the target configuration is not one data center, this invention can be applied. The third embodiment discloses how to improve the efficiency in the use of resources in a multi data centers environment. The system configuration and procedure are almost the same as those of the second embodiment. The following discusses only the differences with the second embodiment.

Figure 17:
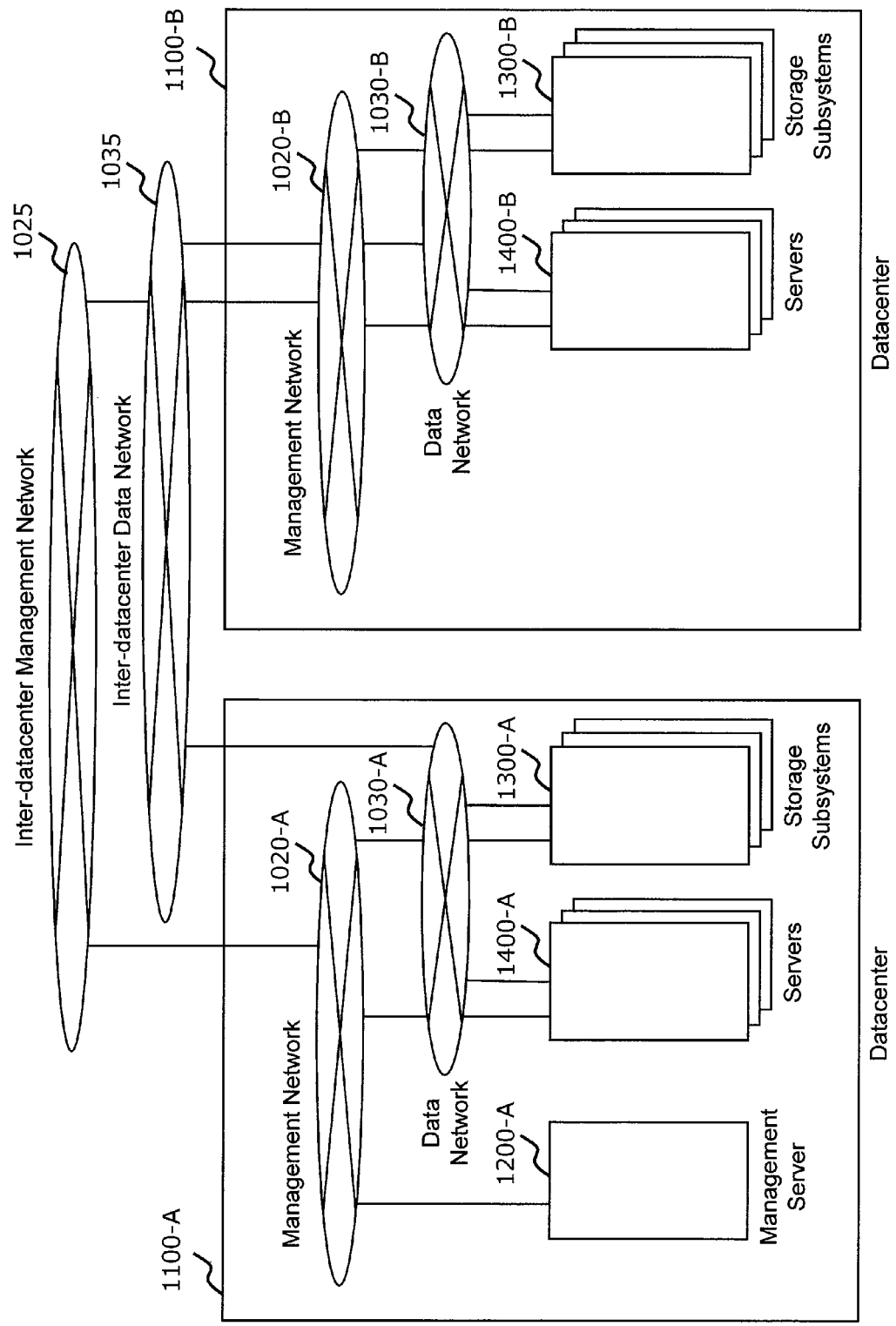
FIG. 17 illustrates an example of a hardware configuration of a multi data centers system according to the second embodiment.

FIG. 17 illustrates an example of a hardware configuration of a multi data centers system according to the second embodiment. The system shown has two data centers, but the invention is not limited to two data centers. Each data center 1100 includes Servers 1300 and Storage Subsystems 1400. One Management Server 1200 is placed at one data center, but the invention is not limited to one management server. Multiple management servers can be provided. The Servers 1300 and Storage Subsystems 1400 are connected via a Data Network 1030. This network is typically a SAN, but it is not limited to this. Multiple data networks 1030 are connected via an Inter-datacenter Data Network 1035. The Servers 1300, Storage Subsystems 1400, and Management Server 1200 are connected via a Management Network 1020. This network is typically an Ethernet LAN, but it is not limited to this. In the embodiment shown, the Management Network and Data Network are separate, but it is not limited to this. Multiple management networks 1020 are connected via an Inter-datacenter Management Network 1025. The configuration of the Management Server 1200 is the same as that of the second embodiment. The configuration of the Server 1300 is almost the same as that of the second embodiment. The configuration of the Storage Subsystem 1400 is almost the same as that of the second embodiment.

Figure 18:
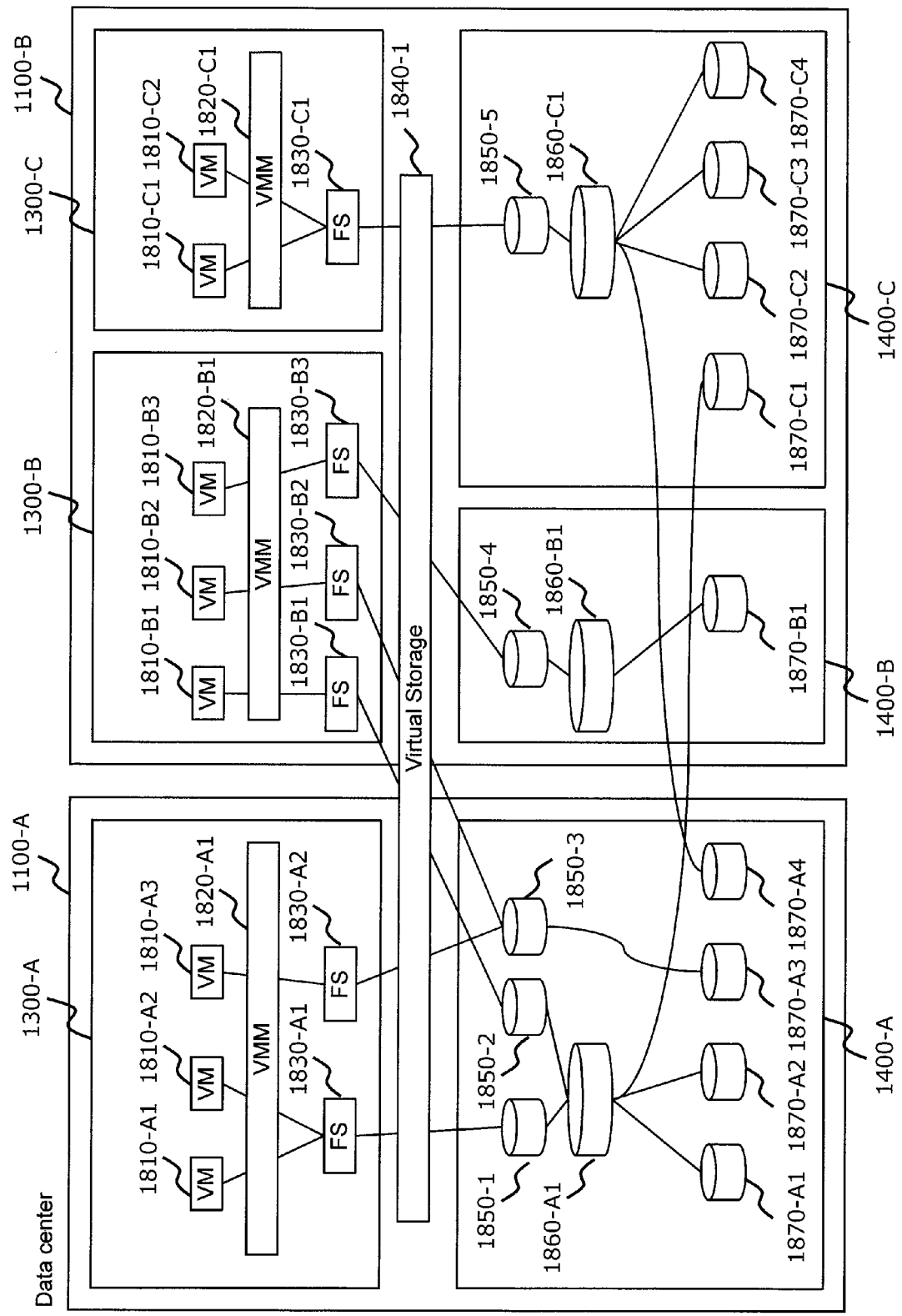
FIG. 18 shows an example of the logical configuration of the data center system according to the third embodiment.

FIG. 18 shows an example of the logical configuration of the data center system 1100 according to the third embodiment. It shows the logical configuration of the system from Virtual Machine to Physical Volume. This configuration is almost the same as the configuration of the second embodiment. The differences are that the system of the third embodiment has two data centers 1100-A and 1100-B. Server 1300-A and Storage 1400-A are in the same data center 1100-A, while servers 1300-B and 1300-C and storage subsystems 1400-B and 1400-C are in the same data center 1100-B.

FIG. 19 shows an example of the Configuration Information Table 2002 in the Management Server 1200 according to the third embodiment. It shows the Configuration Information Table 2002 created in the Management Servers Memory 1240 by the Efficiency Improvement Program 1262. This table shows the logical mapping relationship from Virtual Machine to Physical Volume. This configuration is almost the same as the configuration of the second embodiment. There are three differences. First, the Data Center ID of Virtual Machine row 2139 shows the identification of the data center on which the virtual machine of this column is executed. For example, column 2009 shows virtual machine VM_A1 is executed in data center 1100-A. Second, the Data Center ID of Virtual Volume row 2159 shows the identification of the data center on which the virtual volume exists. For example, column 2007 shows virtual volume VVOL_1 exists in data center 1100-A. Third, the Data Center ID of Physical Volume row 2179 shows the identification of the data center on which the physical volume exists. For example, column 2019 shows physical volume RG_C1 exists in data center 1100-B.

The configuration of the IOPS Table 3000 in the Management Server 1200 is the same as that of the first embodiment. The configuration of the Pool Configuration Table 4000 in the Management Server 1200 is the same as that of the first embodiment. The configuration of the Media Performance Table 5000 in the Management Server 1200 is the same as that of the first embodiment.

Figure 20:
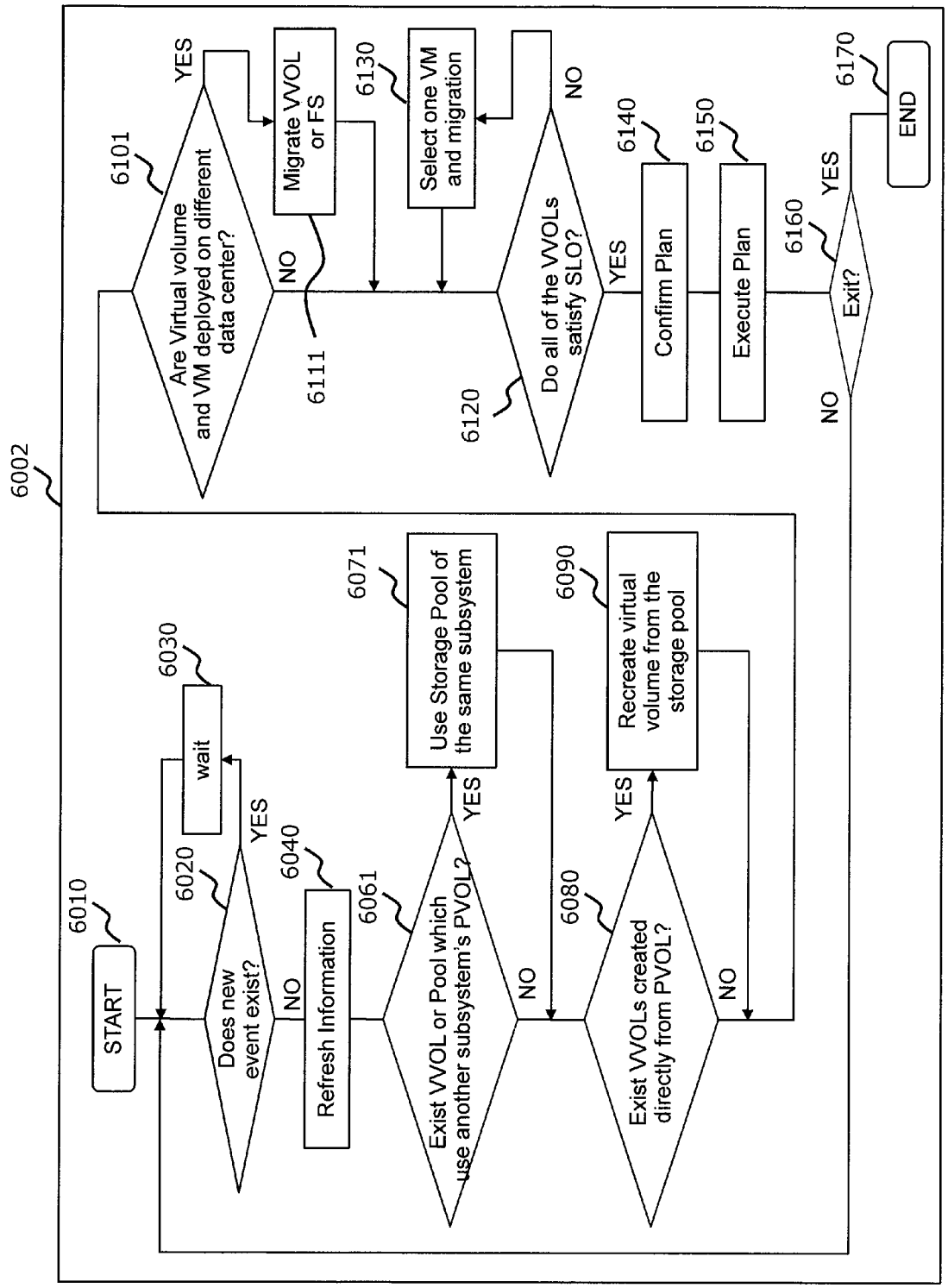
FIG. 20 shows an example of a flow diagram of the Efficiency Improvement Program in the Management Server according to the third embodiment.

FIG. 20 shows an example of a flow diagram of the Efficiency Improvement Program 1262 in the Management Server 1200-A according to the third embodiment. Steps 6010, 6020, 6030, and 6040 are the same as those of the second embodiment. Step 6061 is the same as that of the second embodiment. Step 6071 is the same as that of the second embodiment. Step 6080 and step 6090 are almost the same as those of the second embodiment. The only difference is that at the end of the procedure, the program goes to step 6101 instead of step 6120. In step 6101, the program checks whether the Virtual Volume and Virtual Machine are deployed in the same data center. This check is done by comparing row 2139 and row 2159 of the Configuration Information Table 2002. If these fields are different, this virtual machine is executed in a different data center. For example, virtual machine VM_B1 is executed in data center 1100-B and virtual volume VVOL_2 is located in data center 1100-A. Therefore, these two elements are located in different data centers. If all the virtual volume and virtual machine are located in the same data center, the program goes to step 6120; otherwise, it goes to step 6111.

In step 6111, the VVOL and FS are migrated to the same site using one of the following three procedures. First, if the VMM has VM live migration function (such as VMotion) and VM can be migrated to the same site of its virtual volume, then VM is moved. Second, if the storage subsystem has live volume migration function and virtual volume can be migrated to the same site of its VM, then virtual volume is moved. Third, if the VMM has live migration of virtual machine disk file function (Storage VMotion) and virtual machine disk file can be migrated to the same site of its VM, then Virtual Machine disk file is moved. Furthermore, if the Efficiency Improvement Program can execute multiple procedures, it should select the procedure with the minimum cost. For example, if cost of execution is first procedure<second procedure<third procedure, and any of the procedures can be executed, the first procedure should be selected. After step 6111, the program proceeds to step 6120. Steps 6110, 6120, 6130, 6140, 6150, 6160, and 6170 are the same as those of the first embodiment. For step 6130, if the largest free space of the storage pool of the selected data center is not smaller than the selected virtual machine disk file, as a modified plan, the selected virtual machine and its virtual machine disk file are migrated to the selected data center.

Figure 21:
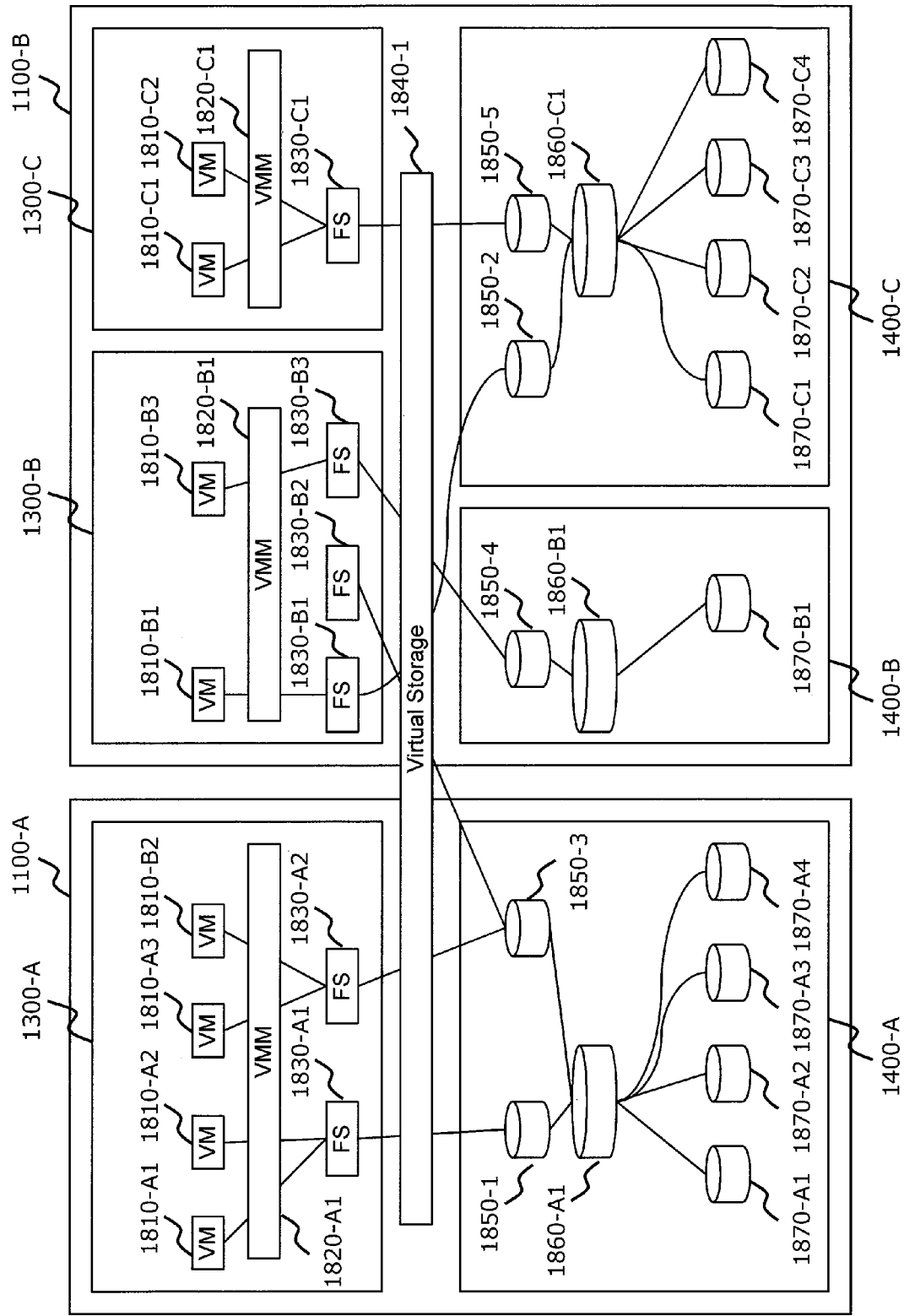
FIG. 21 shows an example of the logical configuration of the data center system after execution of the Efficiency Improvement Program according to the third embodiment.

FIG. 21 shows an example of the logical configuration of the data center system after execution of the Efficiency Improvement Program 1262 according to the third embodiment. As a result of efficiency improvement, all the File Systems of the virtual machine use the Virtual Volume of the same converged platform. The created plan has the following features. Based on step 6070, Physical Volume 1870-A3 is connected to Storage Pool 1860-A1, Physical Volume 1870-A4 is connected to Storage Pool 1860-A1, and Physical Volume 1870-C1 is connected to Storage Pool 1860-C1. Based on step 6090, Virtual Volume 1850-3 is connected to Storage Pool 1860-A1. Based on step 6111, Virtual Volume 1850-2 is migrated to storage subsystem 1400-C by using live volume migration function of storage subsystem, and Virtual Machine 1810-B2 is migrated to server 1300-A by using VM live migration function of VMM.

Of course, the system configurations illustrated in FIGS. 1, 12, and 17 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for improving the efficiency in the use of resources in a data center. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer system comprising:
   a first platform including a first server which executes a first virtual machine and a first storage system which provides a first virtual volume whose virtual storage area corresponds to a storage area of first storage devices in the first storage system;
   a second platform including a second server which executes a second virtual machine and a second storage system which provides a second virtual volume whose virtual storage area corresponds to a storage area of second storage devices in the second storage system; and
   a management computer coupled to the first platform and the second platform;
   wherein the first platform and the second platform are different platforms;
   wherein the first server and the second server are different servers;
   wherein the first virtual machine and the second virtual machine are different virtual machines;
   wherein the first storage system and the second storage system are different storage systems;
   wherein the first storage devices and the second storage devices are different storage devices;
   wherein the first storage system in the first platform and the second storage system in the second platform configure a virtualized storage system to make the first virtual machine to be able to use either the first virtual volume or the second virtual volume, and
   wherein the management computer checks whether the first virtual machine in the first platform uses the second virtual volume in the second platform, and, if the first virtual machine in the first platform uses the second virtual volume in the second platform, instructs to move the first virtual machine from the first server in the first platform to the second server in the second platform where the second virtual volume exists.

2. The computer system according to claim 1, further comprising:
   an external network which couples the first platform to the second platform;
   wherein the first platform further includes a first internal network which couples the first server to the first storage system, and the second platform further includes a second internal network which couples the second server to the second storage system.

3. The computer system according to claim 1,
   wherein the management computer checks whether the first virtual machine in the first platform uses the second virtual volume in the second platform, and, if the first virtual machine in the first platform uses the second virtual volume in the second platform, instructs to move the second virtual volume from the second storage system in the second platform to the first storage system in the first platform where the first virtual machine exists.

4. The computer system according to claim 1,
   wherein the management computer checks whether the first virtual machine in the first platform uses the second virtual volume in the second platform if the first or second virtual volume is not satisfied with a service-level objective regarding response time.

5. The computer system according to claim 1, further comprising:
   an external network which couples to the first platform to the second platform;
   wherein the management computer checks whether the first virtual machine in the first platform uses the second virtual volume in the second platform if consumed bandwidth of the external network exceeds a given threshold.

6. A management computer coupled to a first platform and a second platform of a computer system, the first platform including a first server which executes a first virtual machine and a first storage system which provides a first virtual volume whose virtual storage area corresponds to a storage area of first storage drives in the first storage system, the second platform including a second server which executes a second virtual machine and a second storage system which provides a second virtual volume whose virtual storage area corresponds to a storage area of second storage devices in the second storage system, wherein the first storage system in the first platform and the second storage system in the second platform configure a virtualized storage system to make the first virtual machine to be able to use either the first virtual volume or the second virtual volume, the management computer comprising:
   a management controller configured to check whether the first virtual machine in the first platform uses the second virtual volume in the second platform;
   wherein the first platform and the second platform are different platforms;
   wherein the first server and the second server are different servers;
   wherein the first virtual machine and the second virtual machine are different virtual machines;
   wherein the first storage system and the second storage system are different storage systems;
   wherein the first storage devices and the second storage devices are different storage devices; and
   wherein if the first virtual machine in the first platform uses the second virtual volume in the second platform, the management controller performs one of (i) instructing to move the first virtual machine from the first server in the first platform to the second server in the second platform where the second virtual volume exists, or (ii) instructing to move the second virtual volume from the second storage system in the second platform to the first storage system in the first platform where the first virtual machine exists.

7. The management computer according to claim 6,
   wherein the computer system further comprises an external network which couples the first platform to the second platform; and
   wherein the first platform further includes a first internal network which couples the first server to the first storage system, and the second platform further includes a second internal network which couples the second server to the second storage system.

8. The management computer according to claim 6,
   wherein the management controller checks whether the first virtual machine in the first platform uses the second virtual volume in the second platform if the first or second virtual volume is not satisfied with a service-level objective regarding response time.

9. The management computer according to claim 6,
   wherein the computer system further comprises an external network which couples the first platform to the second platform; and
   wherein the management controller checks whether the first virtual machine in the first platform uses the second virtual volume in the second platform if consumed bandwidth of the external network exceeds a given threshold.

10. A method for a computer system which includes a first platform including a first server which executes a first virtual machine and a first storage system which provides a first virtual volume whose virtual storage area corresponds to a storage area of first storage drives in the first storage system; a second platform including a second server which executes a second virtual machine and a second storage system which provides a second virtual volume whose virtual storage area corresponds to a storage area of second storage devices in the second storage system; and a management computer coupled to the first platform and the second platform; the method comprising:

configuring a virtualized storage system, by the first storage system in the first platform and the second storage system in the second platform, to make the first virtual machine to be able to use either the first virtual volume or the second virtual volume, and checking, by the management computer, whether the first virtual machine in the first platform uses the second virtual volume in the second platform, and, if the first virtual machine in the first platform uses the second virtual volume in the second platform, instructing to move the first virtual machine from the first server in the first platform to the second server in the second platform where the second virtual volume exists;

wherein the first platform and the second platform are different platforms;

wherein the first server and the second server are different servers;

wherein the first virtual machine and the second virtual machine are different virtual machines;

wherein the first storage system and the second storage system are different storage systems; and wherein the first storage devices and the second storage devices are different storage devices.

11. The method according to claim 10, further comprising:
checking, by the management computer, whether the first virtual machine in the first platform uses the second virtual volume in the second platform, and, if the first virtual machine in the first platform uses the second virtual volume in the second platform, instructing to move the second virtual volume from the second storage system in the second platform to the first storage system in the first platform where the first virtual machine exists.

12. The method according to claim 10,
wherein the management computer checks whether the first virtual machine in the first platform uses the second virtual volume in the second platform if the first or second virtual volume is not satisfied with a service-level objective regarding response time.

13. The method according to claim 10,
wherein the computer system further includes an external network which couples to the first platform to the second platform; and wherein the management computer checks whether the first virtual machine in the first platform uses the second virtual volume in the second platform if consumed bandwidth of the external network exceeds a given threshold.

14. A method for a management computer coupled to a first platform and a second platform of a computer system, the first platform including a first server which executes a first virtual machine and a first storage system which provides a first virtual volume whose virtual storage area corresponds to a storage area of first storage drives in the first storage system, the second platform including a second server which executes a second virtual machine and a second storage system which provides a second virtual volume whose virtual storage area corresponds to a storage area of second storage devices in the second storage system, wherein the first storage system in the first platform and the second storage system in the second platform configure a virtualized storage system to make the first virtual machine to be able to use either the first virtual volume or the second virtual volume, the method comprising:

checking whether the first virtual machine in the first platform uses the second virtual volume in the second platform; and if the first virtual machine in the first platform uses the second virtual volume in the second platform, performing one of (i) instructing to move the first virtual machine from the first server in the first platform to the second server in the second platform where the second virtual volume exists, or (ii) instructing to move the second virtual volume from the second storage system in the second platform to the first storage system in the first platform where the first virtual machine exists;

wherein the first platform and the second platform are different platforms;

wherein the first server and the second server are different servers;

wherein the first virtual machine and the second virtual machine are different virtual machines;

wherein the first storage system and the second storage system are different storage systems; and wherein the first storage devices and the second storage devices are different storage devices.

15. The method according to claim 14,
wherein the management computer checks whether the first virtual machine in the first platform uses the second virtual volume in the second platform if the first or second virtual volume is not satisfied with a service-level objective regarding response time.

16. The method according to claim 14,
wherein the computer system further comprises an external network which couples the first platform to the second platform; and wherein the management computer checks whether the first virtual machine in the first platform uses the second virtual volume in the second platform if consumed bandwidth of the external network exceeds a given threshold.

* * * * *